United States Patent
Finkle

(10) Patent No.: US 10,476,363 B2
(45) Date of Patent: *Nov. 12, 2019

(54) HYBRID ELECTRIC MOTOR WITH SELF ALIGNING PERMANENT MAGNET AND SQUIRREL CAGE DUAL ROTORS MAGNETICALLY COUPLED WITH PERMEANT MAGNETS AND BARS AT SYNCHRONOUS SPEED

(71) Applicant: Louis J. Finkle, Lakewood, CA (US)

(72) Inventor: Louis J. Finkle, Lakewood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/924,562

(22) Filed: Mar. 19, 2018

(65) Prior Publication Data
US 2018/0212502 A1   Jul. 26, 2018

Related U.S. Application Data

(63) Continuation-in-part of application No. 14/229,673, filed on Mar. 28, 2014, now Pat. No. 9,923,440, (Continued)

(51) Int. Cl.
*H02K 21/00* (2006.01)
*H02K 21/46* (2006.01)
(Continued)

(52) U.S. Cl.
CPC ............. *H02K 21/46* (2013.01); *H02K 1/223* (2013.01); *H02K 16/02* (2013.01); *H02K 17/26* (2013.01);
(Continued)

(58) Field of Classification Search
CPC ............ H02K 1/22; H02K 1/223; H02K 1/27; H02K 1/2706; H02K 1/2786; H02K 1/28;
(Continued)

(56) References Cited

U.S. PATENT DOCUMENTS

| 2,209,558 A | 7/1940 | Bing et al. |
| 2,243,616 A | 5/1941 | Bing et al. |

(Continued)

FOREIGN PATENT DOCUMENTS

| CN | 102868268 | 1/2011 |
| CN | 1360748 | 7/2014 |

(Continued)

OTHER PUBLICATIONS

JP11341757 English Translation.*

*Primary Examiner* — Julio C. Gonzalez
*Assistant Examiner* — Maged M Almawri
(74) *Attorney, Agent, or Firm* — Kenneth L. Green; Averill & Green

(57) ABSTRACT

A hybrid induction motor includes a fixed stator, an independently rotating outer rotor, and an inner rotor fixed to a motor shaft. The outer rotor is designed to have a low moment of inertia and includes angularly spaced apart first bars and permanent magnets on an inner surface of the outer rotor. The inner rotor includes angularly spaced apart second bars and interior flux barriers aligned with the second bars. The outer rotor is initially accelerated by cooperation of a rotating stator magnetic field with the first bars. As the outer rotor accelerates towards synchronous RPM, a rotating magnetic field of the permanent magnets cooperate with the second bars of the inner rotor to accelerate the inner rotor. At near synchronous speed the rotating stator magnetic field reaches through the outer rotor and into the inner rotor coupling the two rotors for efficient permanent magnet operation.

18 Claims, 20 Drawing Sheets

Related U.S. Application Data which is a continuation-in-part of application No. 14/151,333, filed on Jan. 9, 2014, now Pat. No. 9,923,439, application No. 15/924,562, which is a continuation-in-part of application No. 15/438,023, filed on Feb. 21, 2017.

(51) Int. Cl.
  *H02K 1/22* (2006.01)
  *H02K 17/26* (2006.01)
  *H02K 16/02* (2006.01)
  *H02K 1/27* (2006.01)
  *H02K 1/24* (2006.01)
  *H02K 17/20* (2006.01)

(52) U.S. Cl.
  CPC .............. *H02K 1/246* (2013.01); *H02K 1/276* (2013.01); *H02K 1/2706* (2013.01); *H02K 1/2786* (2013.01); *H02K 17/205* (2013.01)

(58) Field of Classification Search
  CPC ........ H02K 1/276; H02K 21/46; H02K 16/02; H02K 16/04
  USPC ......... 310/211, 212, 156.78–156.81, 156.53, 310/156.56, 156.57, 166, 125, 111, 112, 310/114, 266, 269
  See application file for complete search history.

(56) References Cited

U.S. PATENT DOCUMENTS

| | | | |
|---|---|---|---|
| 2,287,286 A | 6/1942 | Bing et al. | |
| 2,558,540 A | 6/1951 | Clos | |
| 2,864,017 A | 12/1958 | Dimo | |
| 3,445,699 A | 5/1969 | Beaudry | |
| 3,459,981 A | 8/1969 | Dotto | |
| 4,151,431 A | 4/1979 | Johnson | |
| 4,285,725 A | 8/1981 | Gysel et al. | |
| 4,482,034 A | 11/1984 | Baermann | |
| 4,508,998 A | 4/1985 | Hahn | |
| 4,578,609 A | 3/1986 | McCarty | |
| 4,829,205 A | 5/1989 | Lindgren et al. | |
| 5,166,654 A | 11/1992 | Doyelle | |
| 5,285,124 A | 2/1994 | Satake | |
| 5,508,576 A | 4/1996 | Nagate et al. | |
| 5,594,289 A | 1/1997 | Minato | |
| 5,886,443 A | 3/1999 | Dymond | |
| 6,181,047 B1 | 1/2001 | Nitta | |
| 6,376,959 B1 | 4/2002 | Leupold | |
| 6,380,655 B1 * | 4/2002 | Ide .................... | H02K 16/02 310/211 |
| 6,771,000 B2 | 8/2004 | Kim et al. | |
| 6,864,773 B2 | 3/2005 | Perrin | |
| 7,459,815 B2 | 12/2008 | Han et al. | |
| 7,567,004 B2 | 7/2009 | Smith | |
| 7,741,746 B2 | 6/2010 | Groening | |
| 7,851,962 B1 | 12/2010 | Williams | |
| 7,928,621 B2 * | 4/2011 | Han ...................... | H02K 16/00 310/112 |
| 8,072,108 B2 | 12/2011 | Finkle | |
| 8,097,993 B2 | 1/2012 | Finkle | |
| 8,288,908 B2 | 10/2012 | Finkle et al. | |
| 8,390,162 B2 | 3/2013 | Finkle et al. | |
| 2004/0041481 A1 | 3/2004 | Kuo | |
| 2006/0038457 A1 | 2/2006 | Miyata et al. | |
| 2006/0108888 A1 | 5/2006 | Jung et al. | |
| 2006/0175924 A1 | 8/2006 | Han | |
| 2006/0226722 A1 | 10/2006 | Kim | |
| 2007/0216248 A1 * | 9/2007 | Han ...................... | H02K 16/02 310/114 |
| 2007/0228856 A1 | 10/2007 | Bates et al. | |
| 2008/0169717 A1 | 7/2008 | Takashima | |
| 2008/0179987 A1 | 7/2008 | Imazu | |
| 2008/0272667 A1 | 11/2008 | Lonel | |
| 2009/0315329 A1 | 12/2009 | Duffey | |
| 2010/0219304 A1 | 9/2010 | Miros et al. | |
| 2010/0219704 A1 | 9/2010 | Han et al. | |
| 2011/0156518 A1 | 6/2011 | Bright | |
| 2011/0163623 A1 | 7/2011 | Rens | |
| 2011/0101812 A1 | 11/2011 | Finkle et al. | |
| 2013/0057091 A1 | 3/2013 | Kim | |
| 2013/0234553 A1 | 9/2013 | Kusase | |

FOREIGN PATENT DOCUMENTS

| | | |
|---|---|---|
| DE | 4421594 | 7/2014 |
| EP | 1689067 | 8/2006 |
| GB | 495813 | 11/1938 |
| JP | S 51-47208 | 4/1976 |
| JP | 62-117558 | 11/1988 |
| JP | 9065591 | 11/1988 |
| JP | H04-331445 | 4/1992 |
| JP | H 07-203644 A | 3/1997 |
| JP | H11146615 A | 5/1999 |
| JP | 11341757 | 12/1999 |
| JP | 2002-315244 | 10/2002 |
| JP | 2003-088071 A | 3/2003 |
| JP | 2004 135377 A | 3/2003 |
| JP | 2004 140978 | 5/2004 |
| JP | 2004 336915 A | 11/2004 |
| JP | 2005124383 A | 5/2005 |
| JP | 2005-210826 | 8/2005 |
| JP | 2006-254638 | 8/2005 |
| JP | 201145509 S5 | 1/2006 |
| JP | 2006-217792 | 8/2006 |
| JP | 2006-352973 A | 9/2006 |
| JP | 2007-503199 | 2/2007 |
| JP | 2008-148455 | 6/2008 |
| JP | 2011-061933 | 3/2011 |
| JP | 5702692 B2 | 4/2015 |
| JP | 2017502641 A | 1/2017 |
| KR | 10-2005-011667 | 12/2005 |
| WO | WO 88/05976 | 8/1988 |
| WO | WO 2004107539 | 8/1988 |
| WO | WO2011145509 A1 | 5/2011 |
| WO | WO2013-158881 | 10/2013 |

\* cited by examiner

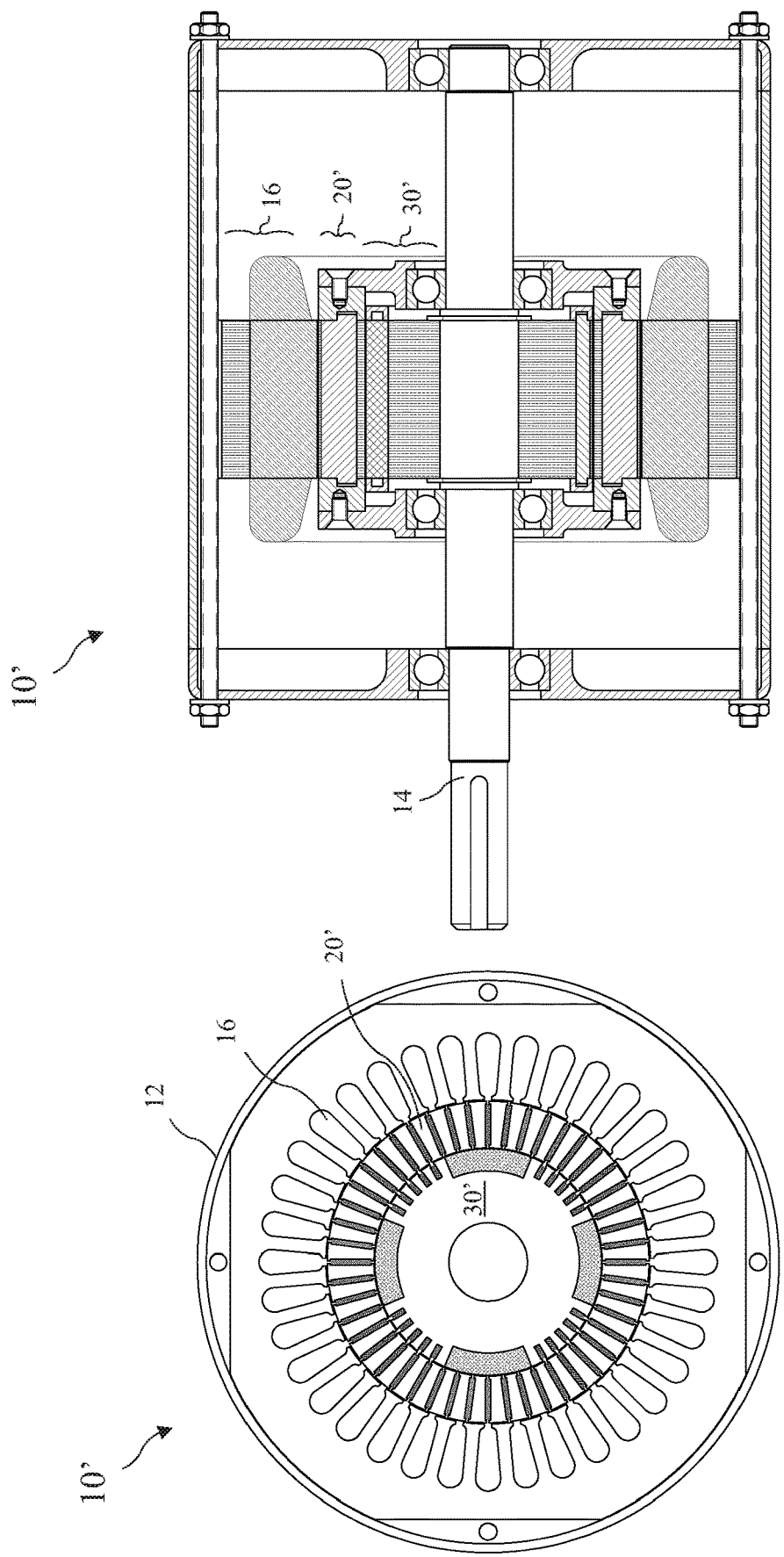

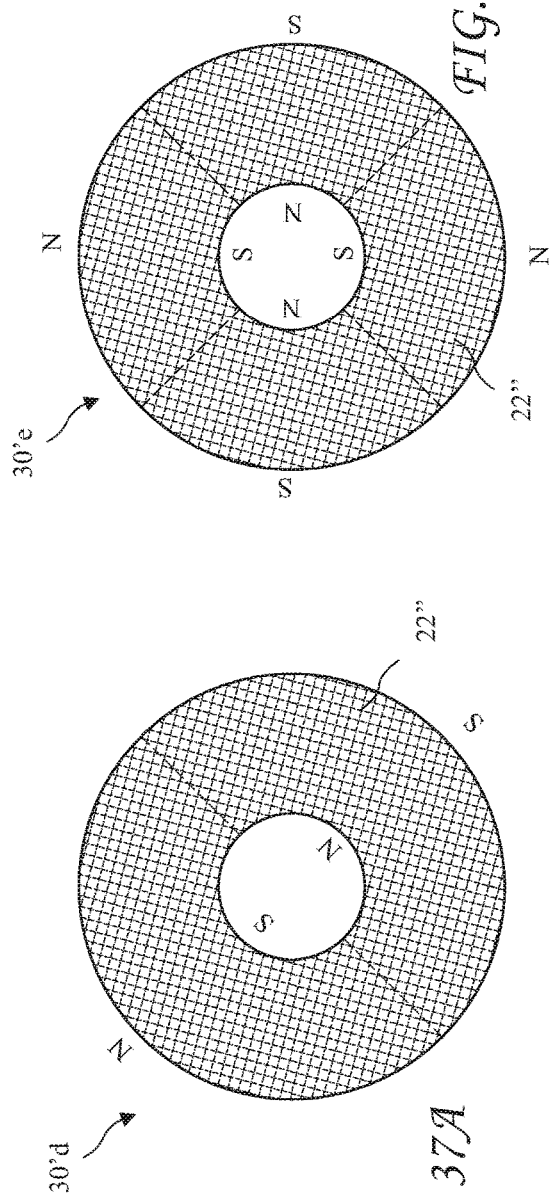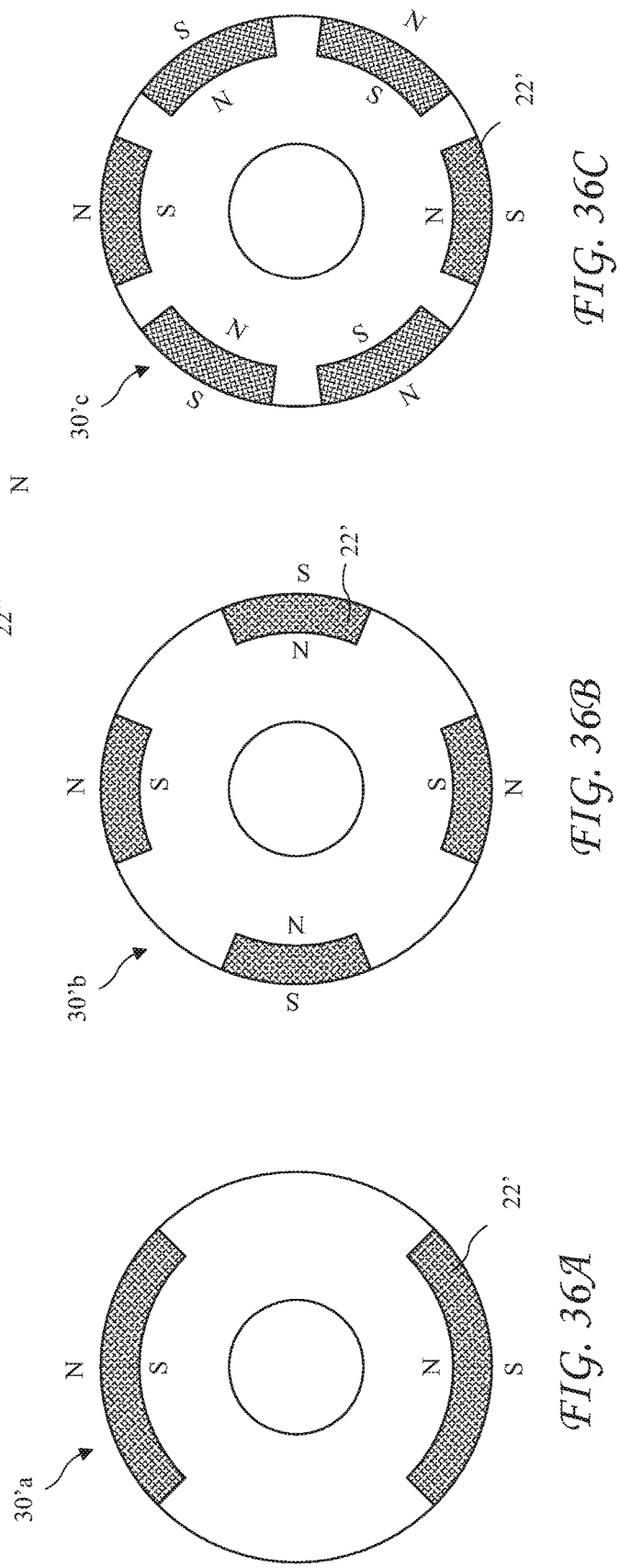

HYBRID ELECTRIC MOTOR WITH SELF ALIGNING PERMANENT MAGNET AND SQUIRREL CAGE DUAL ROTORS MAGNETICALLY COUPLED WITH PERMEANT MAGNETS AND BARS AT SYNCHRONOUS SPEED

CROSS-REFERENCE TO RELATED APPLICATIONS

The present application is a Continuation In Part of U.S. patent application Ser. No. 14/151,333 filed Jan. 9, 2014, a Continuation In Part of U.S. patent application Ser. No. 14/229,673 filed Mar. 28, 2014, and a Continuation In Part of U.S. patent application Ser. No. 15/438,023 filed Feb. 21, 2017, which applications is incorporated in its entirety herein by reference.

BACKGROUND OF THE INVENTION

The present invention relates to electric motors and in particular to an induction motor having an independently rotating permanent magnet rotor variably coupled to an inductive rotor to reconfigure the motor from asynchronous induction operation at startup to synchronous operation after startup for efficient operation.

A preferred form of electric motors are brushless AC induction motors. The rotors of induction motors include a cage (or squirrel cage resembling a "hamster wheel") rotating inside a stator. The cage comprises axially running bars angularly spaced apart on the outer perimeter of the rotor. An AC current provided to the stator introduces a rotating stator magnetic field inside the rotor, and the rotating field inductively induces current in the bars. The current induced in the bars creates an induced magnetic field which cooperates with the stator magnetic field to produce torque and thus rotation of the rotor.

The introduction of current into the bars requires that the bars are not moving (or rotating) synchronously with the rotating stator magnetic field because electromagnetic induction requires relative motion (called slipping) between a magnetic field and a conductor in the field. As a result, the rotor must slip with respect to the rotating stator magnetic field to induce current in the bars to produce torque, and the induction motors are therefore called asynchronous motors.

Unfortunately, low power induction motors are not highly efficient at designed operating speed, and are even less efficient under reduced loads because the amount of power consumed by the stator remains constant at such reduced loads.

One approach to improving induction motor efficiency has been to add permanent magnets to the rotor. The motor initially starts in the same manner as a typical induction motor, but as the motor reached its operating speed, the stator magnetic field cooperates with the permanent magnets to enter synchronous operation. Unfortunately, the permanent magnets create transient breaking torque and undesirable anomalies until synchronization occurs because of the changing magnetic pole alignment between the stator and PM cage rotor. Further the permanent magnets are limited in size because if the permanent magnets are too large, they over power the stator flux producing a very poor or unsuccessful starting of motor. Such size limitation limits the benefit obtained from the addition of the permanent magnets U.S. patent application Ser. No. 14/151,333 filed Jan. 9, 2014 filed by the present Applicant discloses an electric motor having an outer stator, an inner rotor including bars, fixed to a motor shaft, and a free spinning outer rotor including permanent magnets and bars, residing between the inner rotor and the stator. At startup, a rotating stator magnetic field accelerates the free spinning outer rotor, and after accelerating, the permanent magnets of the free spinning outer rotor accelerate and then lock with the inner rotor to achieve efficient permanent magnet operation.

The design of the '333 application is suitable for some motor designs, but in other designs, surface effects on the surface of the inner rotor reduce or prevent coupling of the inner rotor with the rotating magnetic fields.

BRIEF SUMMARY OF THE INVENTION

The present invention addresses the above and other needs by providing a hybrid induction motor which includes a fixed stator, an independently rotating outer rotor, and an inner rotor fixed to a motor shaft. In one embodiment the outer rotor includes spaced apart first bars and permanent magnets, and the inner rotor includes spaced apart second bars. In another embodiment the outer rotor includes angularly spaced apart first bars but no permanent magnets, and the inner rotor includes permanent magnets and may also include angularly spaced apart second bars. The outer rotor is initially accelerated by cooperation of a rotating stator magnetic field with the first bars. As the outer rotor accelerates towards synchronous RPM, the inner rotor is accelerated to transition to efficient synchronous operation. The outer rotor thus acts as a clutch to decouple the inner rotor from the rotating stator magnetic field at startup and to couple the inner rotor to the rotating stator magnetic field at synchronous speed.

In accordance with one embodiment of the invention, there is provided a hybrid induction motor which includes a fixed stator, an independently rotating Hybrid Permanent Magnet/Squirrel Cage (HPMSC) outer rotor, and a Squirrel Cage (SC) inner rotor fixed to a motor shaft. The HPMSC rotor has N angularly spaced part permanent magnets and N sets of a plurality of first bars angularly spaced apart between consecutive permanent magnets. The SC rotor has N groups of angularly spaced apart second bars, and slots in an outer surface of the SC rotor between consecutive groups of the second bars. The HPMSC rotor is initially accelerated by cooperation of the stator with the first bars. The permanent magnets create a rotating magnetic field in the SC rotor cooperating with the second bars to accelerate the SC rotor. As the HPMSC rotor accelerates towards synchronous RPM, the stator field reaches into the HPMSC rotor and cooperates with the permanent magnets to transition to synchronous operation. Salient poles are created by cooperation of the permanent magnets with the slots in the SC rotor to lock the two rotors at synchronous RPM.

In accordance with another aspect of the invention, there is provided an inner Squirrel Cage (SC) rotor having angularly spaced apart axially extending slots on an outer surface of the inner SC rotor. The spacing of the slots matching the spacing of permanent magnets in an independently rotating hybrid permanent magnet/squirrel cage (HPMSC) outer rotor. At synchronous speed the slots and permanent magnets cooperate to form salient poles coupling the rotation of the SC inner rotor with the HPMSC outer rotor, eliminating a need for mechanical coupling of the HPMSC outer rotor with the SC inner rotor.

In accordance with yet another aspect of the invention, there is provided a motor having an improved sequence of inductive startup and transition to efficient synchronous operation. The design of the first bars of the HPMSC outer rotor produces sufficient torque to over come the drag of the SC inner rotor created by the permanent magnets. As a result, the HPMSC outer rotor reaches synchronous RPM quickly. As the HPMSC outer rotor accelerates faster than the SC inner rotor, the cooperation of the permanent magnets and the second bars of the SC inner rotor create more torque on SC inner rotor to accelerate the SC inner rotor. When first rotor reaches near synchronous rpm, the stator flux penetrates to second bars of the SC inner rotor applying additional torque to further accelerate the SC inner rotor toward synchronous RPM.

In accordance with still another aspect of the invention, there is provided a motor having an HPMSC outer rotor and SC inner rotor coupled by the cooperation of permanent magnets in the HPMSC outer rotor and axially extending slots in the surface of the SC inner rotor. The depth of the slots may be altered based on the purpose of the motor to optimize locking of the SC inner rotor to the HPMSC outer rotor.

In accordance with another embodiment of the invention, there is provided a hybrid induction motor which includes a fixed stator, an independently rotating Squirrel Cage (SC) outer rotor, and a Permanent Magnet (PM) inner rotor fixed to a motor shaft. The SC outer rotor has angularly spaced apart first bars. The PM inner rotor may include groups of second bars in spaces between the permanent magnets. The SC outer rotor is initially accelerated by cooperation of a rotating stator magnetic field with the first bars. As the SC outer rotor accelerates towards synchronous RPM, the stator field reaches through the SC outer rotor and cooperates with the PM inner rotor to accelerate the PM inner rotor to transition to synchronous operation. The SC outer rotor thus acts as a clutch to decouple the PM inner rotor from the rotating stator magnetic field at startup and to couple the PM inner rotor to the rotating stator magnetic field at synchronous speed. As the SC outer rotor accelerates, magnetic flux of the permanent magnets in the PM inner rotor cooperates with the first bars in the SC outer rotor producing torque and accelerating the PM inner rotor simultaneously. As the SC outer rotor RPM increases closer to stator flux RPM, the stator flux penetrates the SC outer rotor and imparts more flux on the PM inner rotor adding additional torque to the PM inner rotor to accelerate the PM inner rotor to synchronous operation.

In accordance with yet another embodiment of the invention, there is provided a hybrid induction motor includes a fixed stator, an independently rotating outer rotor, and an inner rotor fixed to a motor shaft. The outer rotor is designed to have a low moment of inertia and includes angularly spaced apart first bars and permanent magnets on an inner surface of the outer rotor. The inner rotor includes angularly spaced apart second bars and interior flux barriers aligned with the second bars. The outer rotor is initially accelerated by cooperation of a rotating stator magnetic field with the first bars. As the outer rotor accelerates towards synchronous RPM, a rotating magnetic field of the permanent magnets cooperate with the second bars of the inner rotor to accelerate the inner rotor. At near synchronous speed the rotating stator magnetic field reaches through the outer rotor and into the inner rotor coupling the two rotors for efficient permanent magnet operation.

In accordance with one aspect of the invention, there is provided a hybrid induction motor which includes a fixed stator, an independently rotating Hybrid Permanent Magnet/ squirrel Cage (HPMSC) outer rotor, and a Squirrel Cage (SC) inner rotor fixed to a motor shaft. The HPMSC outer rotor has a multiplicity of angularly spaced apart first bars proximal to an outer surface of the HPMSC outer rotor, and a plurality of permanent magnets on an inner surface of the HPMSC outer rotor. The SC inner rotor has a multiplicity of angularly spaced apart second bars proximal to an outer surface of the SC inner rotor, and magnetic flux barriers aligned with the second bars in rotor laminates. The flux barriers establish lines of stator magnetic flux though the HPMSC outer rotor and the SC inner rotor at synchronous speed to couple the HPMSC outer rotor and the SC inner rotor.

The HPMSC outer rotor is initially accelerated by cooperation of the rotating stator magnetic field with the first bars. Once the HPMSC outer rotor is rotating, the permanent magnets create a rotating magnetic field in the SC inner rotor cooperating with the second bars to accelerate the SC inner rotor. As the HPMSC outer rotor accelerates towards synchronous RPM, the stator magnetic field reaches through the HPMSC outer rotor and cooperates with the permanent magnets, and into the SC inner rotor coupling the HPMSC and SC inner rotors, to transition to synchronous operation.

In accordance with yet another aspect of the invention, there is provided a motor having stronger permanent magnets than known Line Start Permanent Magnet (LSPM). Known LSPM motors are limited by braking and pulsating torques caused by the permanent magnets. The first bars and magnets of the HPMSC outer rotor are light weight and the HPMSC outer rotor is decoupled from the motor shaft and load at startup, allowing stronger permanent magnets than the known LSPM motors. The stronger permanent magnets provide improved efficiency.

In accordance with yet another aspect of the invention, there is provided a motor having outer bars of an HPMSC outer rotor aligned with inner bars of an SC inner rotor. At synchronous speed magnetic field lines of the rotating stator magnetic field pass between the aligned bars and into the SC inner rotor to couple the HPMSC outer rotor and the SC inner rotor.

In accordance with still another aspect of the invention, there is provided a motor having a number of larger squirrel cage bars mixed with smaller squirrel cage bars of the HPMSC outer rotor. The larger bars improve the structural strength of the HPMSC outer rotor.

In accordance with another aspect of the invention, there is provided a method according to the present invention. The method includes providing electrical current to a stator, generating a rotating stator magnetic field, the rotating stator magnetic field inductively cooperating with a squirrel cage of an HPMSC outer rotor, the rotating stator magnetic field accelerating the HPMSC outer rotor, permanent magnets of the HPMSC outer rotor generating a rotating permanent magnet magnetic field, the rotating permanent magnet magnetic field inductively cooperating with a squirrel cage of an SC inner rotor, the rotating stator magnetic field accelerating the SC outer rotor, the HPMSC outer rotor and SC inner rotor approaching synchronous speed, and the HPMSC outer rotor and SC inner rotor magnetically coupling at synchronous speed.

In accordance with yet another aspect of the invention, there is provided a hybrid induction motor according to the present invention including a Hybrid Permanent Magnet Hysteresis (HPMH) outer rotor. An eddy current ring (or hysteresis) inductive starting element replaces the squirrel cage of the HPMSC outer rotor to provide initial starting torque. Once the HPMH outer rotor reaches synchronous speed, the inductive starting element has no effect on motor operation. The eddy current ring may be any electrically conductive material would be potential material for starting element and is commonly hard chrome or cobalt steel but may be any non ferrous material. A preferably material for the HPMH outer rotor ring of the present invention is copper which is efficient because of its high electrical conductivity. Silver is slightly better performing than copper having better electrical conductivity and aluminum is lower performing than copper having less electrical conductivity. Potentially, new nanotechnology and a new class of highly conductive material could offer better performance than copper.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 24 shows a cross-sectional view of a second embodiment the electric motor having an independently rotating SC outer rotor and an HPMSC inner rotor fixedly coupled to a motor shaft taken along line 2-2 of FIG. 1B, according to the present invention.

FIG. 25 shows a cross-sectional view of the second embodiment of the electric motor having the independently rotating SC outer rotor and the HPMSC inner rotor fixedly coupled to a motor shaft taken along line 3-3 of FIG. 1A, according to the present invention.

FIG. 36A shows a first embodiment of a PM inner rotor according to the present invention.

FIG. 36B shows a second embodiment of a PM inner rotor according to the present invention.

FIG. 36C shows a third embodiment of a PM inner rotor according to the present invention.

FIG. 37A shows a fourth embodiment of a PM inner rotor according to the present invention.

FIG. 37B shows a fifth embodiment of a PM inner rotor according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
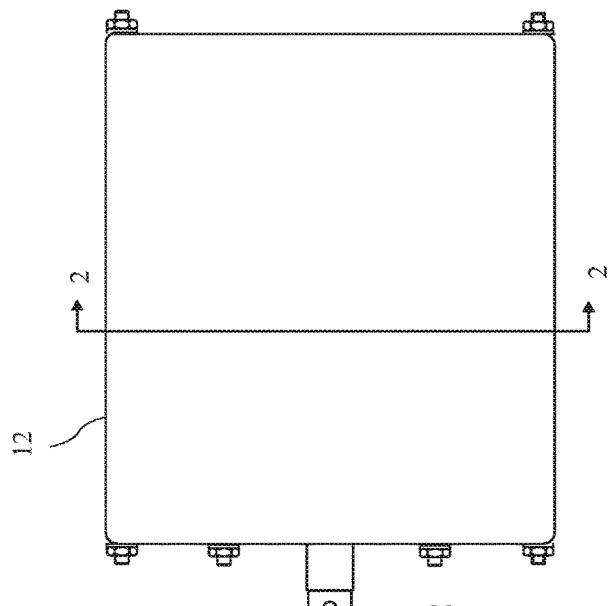
FIG. 1A shows an end view of an electric motor having an independently rotating Hybrid Permanent Magnet/squirrel Cage (HPMSC) outer rotor and a Squirrel Cage (SC) inner rotor fixedly coupled to a motor shaft, according to the present invention.
Figure 1B:
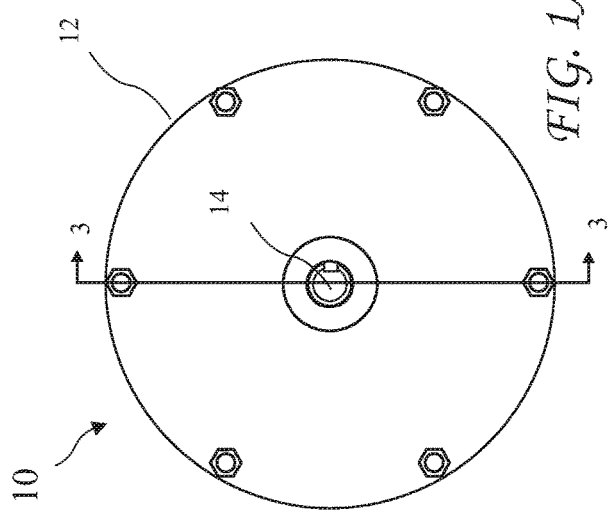
FIG. 1B shows a side view of the electric motor having an independently rotating HPMSC outer rotor and a Squirrel Cage (SC) inner rotor fixedly coupled to a motor shaft, according to the present invention.
Figure 3:
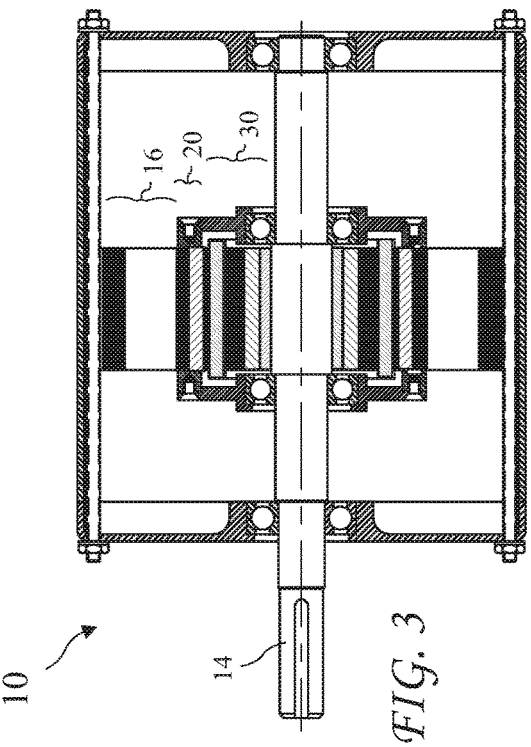
FIG. 3 shows a cross-sectional view of the electric motor having the independently rotating HPMSC outer rotor and the SC inner rotor fixedly coupled to a motor shaft taken along line 3-3 of FIG. 1A, according to the present invention.
Figure 2:
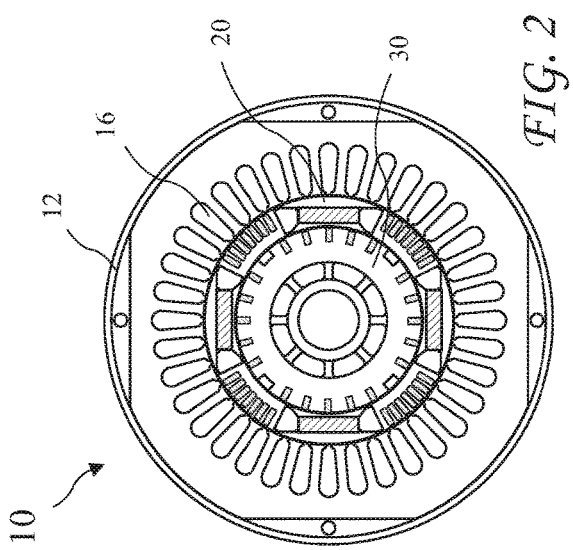
FIG. 2 shows a cross-sectional view of the electric motor having the independently rotating HPMSC outer rotor and the SC inner rotor fixedly coupled to a motor shaft taken along line 2-2 of FIG. 1B, according to the present invention.

An end view of an electric motor 10 having an independently rotating Hybrid Permanent Magnet/Squirrel Cage (HPMSC) outer rotor 20 and a Squirrel Cage (SC) inner rotor 30 fixedly coupled to a motor shaft 14, according to the present invention is shown in FIG. 1A, and a side view of the electric motor 10 is shown in FIG. 1B. A cross-sectional view of the electric motor 10 taken along line 2-2 of FIG. 1B, is shown in FIG. 2, and a cross-sectional view of the electric motor 10 taken along line 3-3 of FIG. 1A is shown in FIG. 3. The electric motor 10 includes a housing 12, a stator portion 16 fixedly coupled to the housing 12, the independently rotating HPMSC outer rotor 20 riding on bearings 29 (see FIG. 7), and the SC inner rotor 30 fixed to the motor shaft 14.

Figure 4:
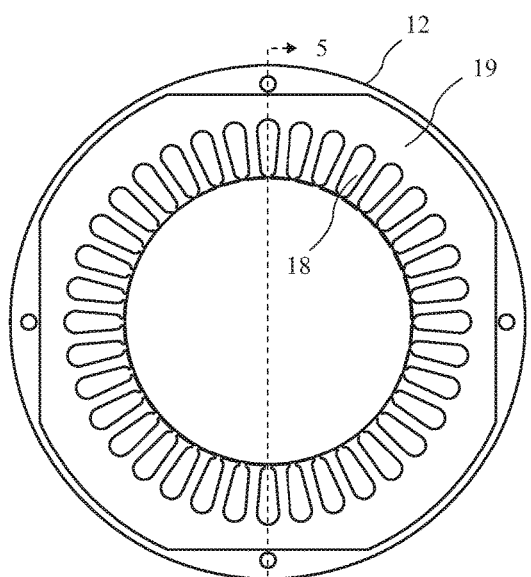
FIG. 4 shows a cross-sectional view of a housing and fixed stator portion of the electric motor having the independently rotating HPMSC outer rotor and the SC inner rotor fixedly coupled to a motor shaft taken along line 2-2 of FIG. 1B, according to the present invention.
Figure 5:
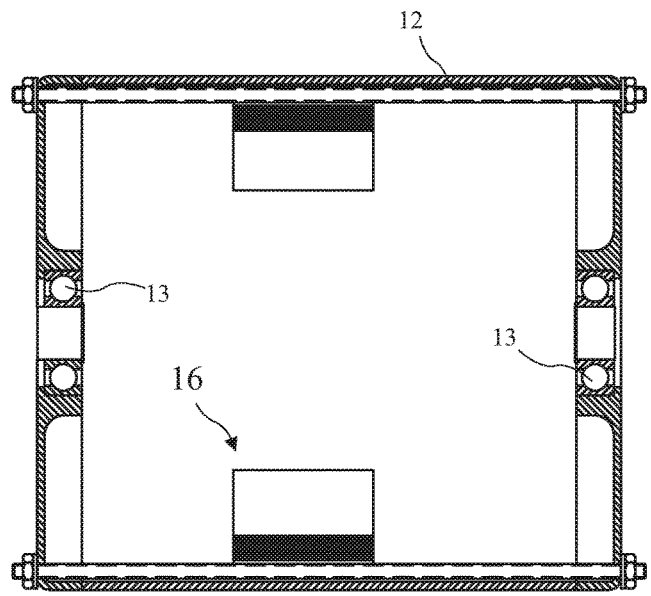
FIG. 5 shows a cross-sectional view of the housing and the fixed stator portion of the electric motor having the independently rotating HPMSC outer rotor and the SC inner rotor fixedly coupled to a motor shaft taken along line 5-5 of FIG. 4, according to the present invention.

A cross-sectional view of the housing 12 and fixed stator portion 16 of the electric motor 10 taken along line 2-2 of FIG. 1B, is shown in FIG. 4 and a cross-sectional view of the housing 12 and the fixed stator portion 16 taken along line 5-5 of FIG. 4, is shown in FIG. 5. Fixed stator windings 18 reside in a stator core 19. The stator windings 18 create a rotating stator magnetic field when provided with an Alternating Current (AC) signal. The housing 12 includes bearings 13 for carrying the shaft 14.

Figure 6:
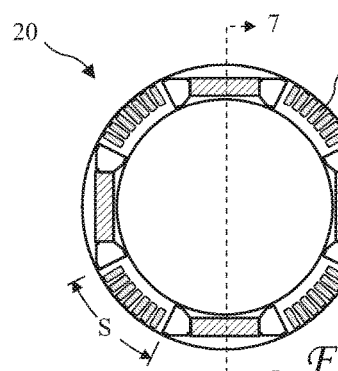
FIG. 6 shows a cross-sectional view of the independently rotating HPMSC outer rotor of the electric motor having the independently rotating HPMSC outer rotor and the SC inner rotor fixedly coupled to a motor shaft taken along line 2-2 of FIG. 1B, according to the present invention.
Figure 7:
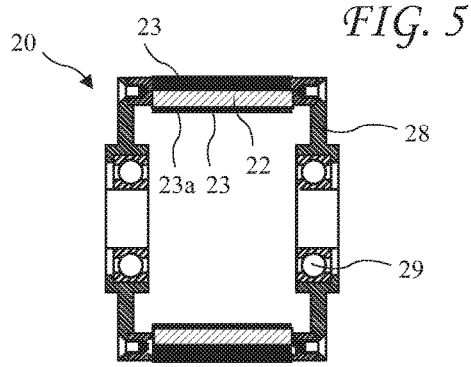
FIG. 7 shows a cross-sectional view of the independently rotating HPMSC outer rotor of the electric motor having the independently rotating HPMSC outer rotor and the SC inner rotor fixedly coupled to a motor shaft taken along line 7-7 of FIG. 6, according to the present invention.

A cross-sectional view of the independently rotating HPMSC outer rotor 20 taken along line 2-2 of FIG. 1B, is shown in FIG. 6 and a cross-sectional view of the independently rotating HPMSC outer rotor 20 taken along line 7-7 of FIG. 6, is shown in FIG. 7. The HPMSC outer rotor 20 includes angularly spaced apart permanent magnets 22 and angularly spaced apart first bars 26 residing in a first rotor core 23. The HPMSC outer rotor 20 may include any even number of permanent magnets 22, for example, two, four, six, eight, etc. permanent magnets 22. Non-ferrous gaps 24 in the rotor core 23 are present at ends of each permanent magnet 22 and the angular width between successive magnets 22 and gaps 24 is an angular segment S. The gaps 24 are air gaps or non ferrous material to minimize flux leakage, if a ferrous material was present at ends of the magnets 22, magnetic flux would curl back into the magnets 22, shorting much of the magnetic flux lines back into the magnets 22. The core 23 is preferably a laminated core 38 and thin sections 23a of the core 23 holding the lamination sections together are considered areas of flux leakage. The thickness of the thin areas 23a are preferably optimized to minimize the leakage while maintaining mechanical integrity of the rotor core 23. The bars 26 are not necessarily but are preferably evenly angularly spaced apart and angularly between the magnets 22.

Rotor end caps 28 are attached to opposite ends of the HPMSC outer rotor 20 and include bearings 29 allowing the HPMSC outer rotor 20 to rotate freely on the motor shaft 14. The bearings 29 are preferably low friction bearings (for example, ball bearings or roller bearings), but may simple be bushings (for example, bronze bushings, oilite bushings, or Kevlar® bushings). The HPMSC outer rotor 20 is not mechanically coupled to rotate with the SC inner rotor 30 or the motor shaft 14 at any time.

Figure 8:
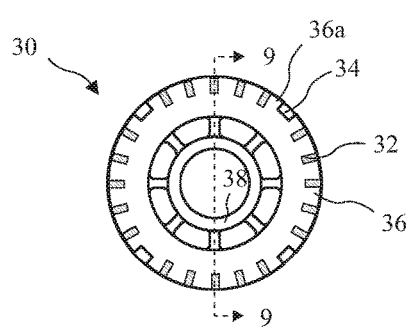
FIG. 8 shows a cross-sectional view of an SC inner rotor of the electric motor having the independently rotating HPMSC outer rotor and the SC inner rotor fixedly coupled to a motor shaft taken along line 2-2 of FIG. 1B, according to the present invention.
Figure 9:
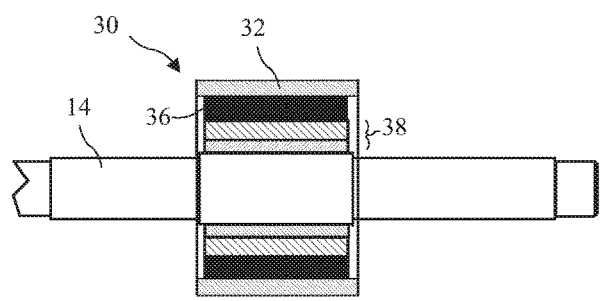
FIG. 9 shows a cross-sectional view of the SC inner rotor of the electric motor having the independently rotating HPMSC outer rotor and the SC inner rotor fixedly coupled to a motor shaft taken along line 9-9 of FIG. 8, according to the present invention.

A cross-sectional view of the SC inner rotor 30 of the electric motor 10 taken along line 2-2 of FIG. 1B, is shown in FIG. 8 and a cross-sectional view of the SC inner rotor 30 of the electric motor 10 taken along line 9-9 of FIG. 8, is shown in FIG. 9. The SC inner rotor 30 is fixed to the motor shaft 14 and couples the HPMSC outer rotor 20 to the motor shaft 14. Second bars 36 reside in a second rotor core 36. The bars are not necessarily but are preferably evenly angularly spaced apart, but are more preferably bi-laterally symmetric (i.e., are in symmetric pairs on opposite sides. A balance between bar 26 resistance and rotor core 23 saturation may be optimized and the shape, number and dimensions of the bars 26 may have great effect on performance, for example, motor startup.

Angularly spaced apart, axially extending slots 34 are formed in a cylindrical outer face 36a of the rotor core 36. The number and spacing of the slots 34 are matched to the number and spacing of the magnets 22 in the HPMSC outer rotor 20. The size, and particularly, the depth, of the slots 34 substantially determine the coupling of the HPMSC outer rotor 20 to the SC inner rotor 30 by affecting the salient poles 50 (see FIG. 11). The salient poles 50 in turn determine the coupling between the HPMSC outer rotor 20 and the SC inner rotor 30 when the motor 10 operates at synchronous speed.

Figure 10:
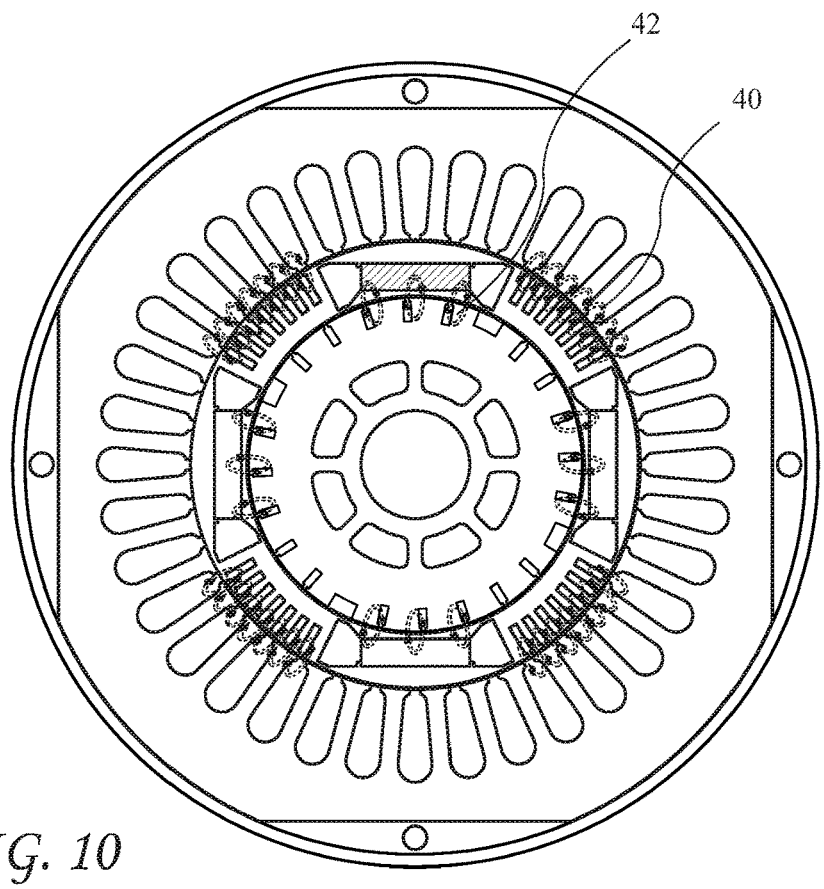
FIG. 10 shows a cross-sectional view of the electric motor having the independently rotating HPMSC outer rotor and the SC inner rotor fixedly coupled to a motor shaft showing magnetic field lines at startup taken along line 2-2 of FIG. 1B, according to the present invention.

A cross-sectional view of the electric motor 10 at startup, taken along line 2-2 of FIG. 1B, is shown in FIG. 10. When AC power is provided to the stator 16, the rotating stator magnetic field inductively cooperates with the first bars 26 in the HPMSC outer rotor 20 to create current in the first bars 26 and the resulting magnetic flux lines 40. However, at start up, the interaction of the rotating stator magnetic field with the stationary rotor bars produces a rotor frequency causing a surface effect, and the rotating stator magnetic field does not penetrate deeply into HPMSC outer rotor 20 and therefore does not reach to portions of the first rotor bars 26 below the surface of the HPMSC outer rotor 20. The rotating stator field then accelerates the HPMSC outer rotor 20. The second bars 32 in the SC inner rotor 30 cooperate with the magnets 22 in the HPMSC outer rotor 20 to accelerate the SC inner rotor 30.

The slots 34 in the SC inner rotor 30 do not align with the magnets 22 at start up because the HPMSC outer rotor 20 accelerates first, causing the magnets 22 (and thus the magnet magnetic field) the skip over the salient poles 50, but still inductively cooperating with second bars 32 of the SC inner rotor 30 until the SC inner rotor 30 reaches near synchronous rpm where the attraction of the salient poles 50 to the magnets 22 is sufficient to hold the SC inner rotor 30 at the same RPM as the HPMSC outer rotor 20. The design of salient poles 50 determines the coupling torque. The coupling torque is designed to be slightly higher than the rated torque of motor to hold the SC inner rotor 30 at the same RPM as the HPMSC outer rotor 20 during normal operation. This design is also advantageous because the design prevents the motor 10 from completely stalling during overload because when the load on the motor shaft 14, and thus on the SC inner rotor 30, exceeds the motor design torque, the SC inner rotor 30 can break away from the HPMSC outer rotor 20 leaving the HPMSC outer rotor 20 at synchronous RPM.

As the HPMSC outer rotor 20 increases in RPM, the rotor frequency decreases, as this occurs the rotating stator magnetic field reaches deeper into HPMSC outer rotor 20 and into the SC inner rotor 30, creating a duel cage rotor effect of a bar section at the surface of rotor and larger section bars deeper into rotor, producing more starting resistance reducing current spikes.

Figure 11:
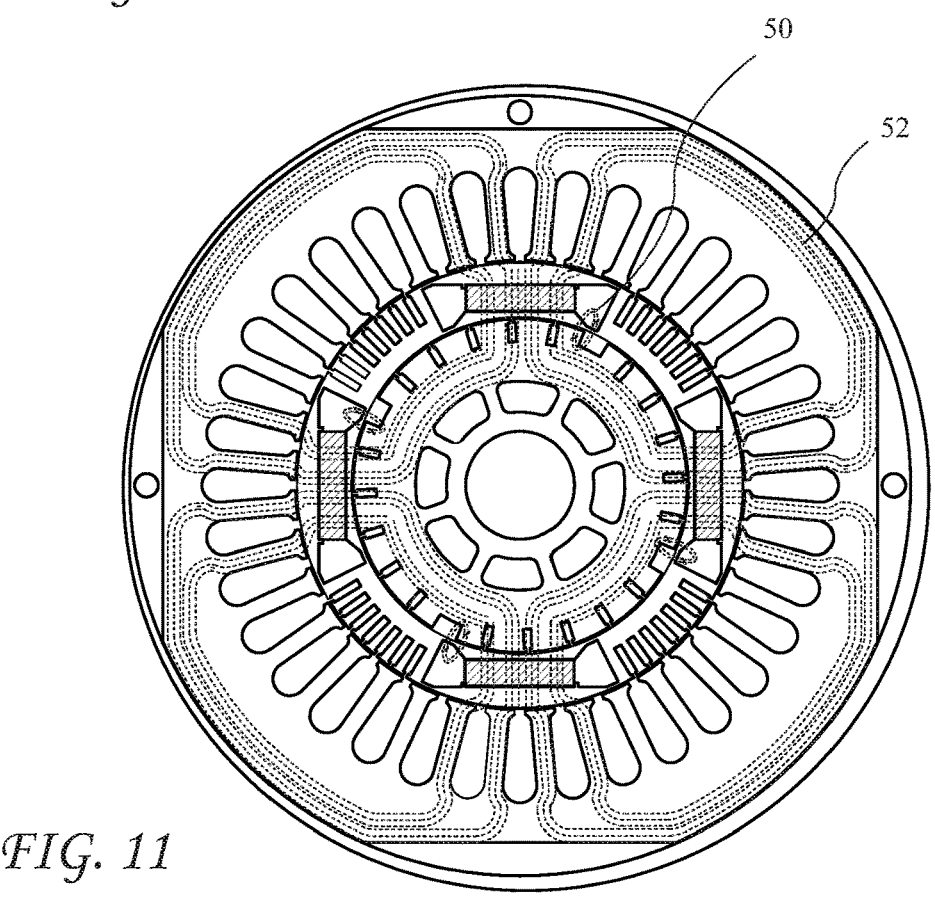
FIG. 11 shows a cross-sectional view of the electric motor having the independently rotating HPMSC outer rotor and the SC inner rotor fixedly coupled to a motor shaft showing magnetic field lines at synchronous speed taken along line 2-2 of FIG. 1B, according to the present invention.

A cross-sectional view of the electric motor 10 at synchronous speed, taken along line 2-2 of FIG. 1B, is shown in FIG. 11. As the HPMSC outer rotor 20 and the SC inner rotor 30 approach synchronous speed the rotor frequency decreases, the cooperation of the HPMSC outer rotor 20 with the rotating stator magnetic field transitions from induction to permanent magnet operation and the magnetic flux 40 and 42 diminishes and flux lines 52 passing though the magnets 22 and into the SC inner rotor 30 grow, resulting the HPMSC outer rotor 20 converging to synchronous operation. The HPMSC outer rotor 20 continues to pull the SC inner rotor 30 towards synchronous speed, and the salient poles 50 couple the SC inner rotor 30 to the HPMSC outer rotor 20 for efficient permanent magnet synchronous operation.

Figures 12, 13:
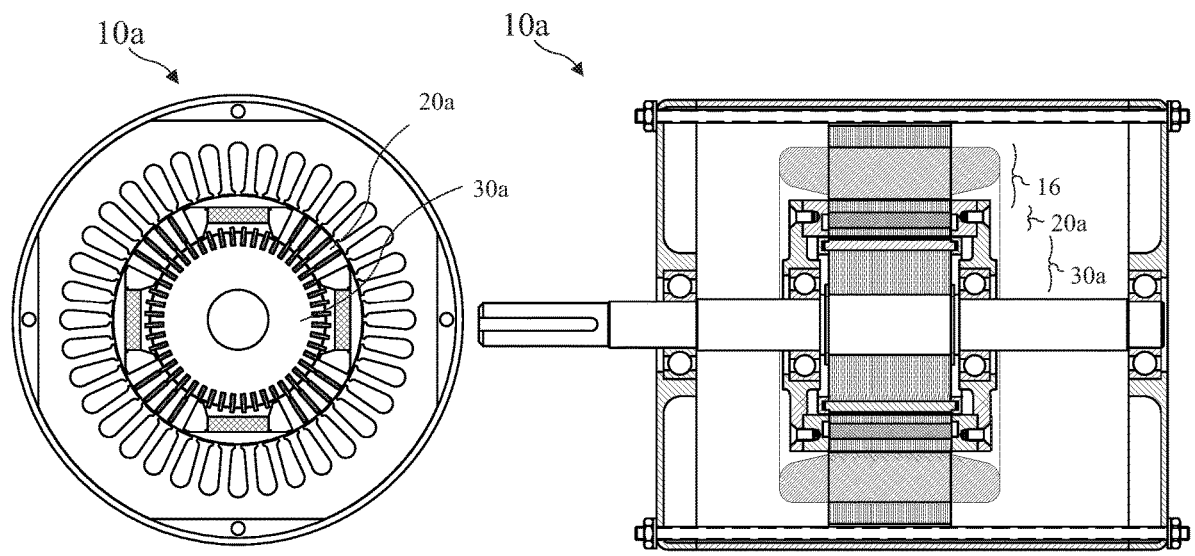
FIG. 12 shows a cross-sectional view of the electric motor having second embodiments of the independently rotating HPMSC outer rotor and the SC inner rotor fixedly coupled to a motor shaft taken along line 2-2 of FIG. 1B, according to the present invention.
FIG. 13 shows a cross-sectional view of the electric motor having the second embodiments of the independently rotating HPMSC outer rotor and the SC inner rotor fixedly coupled to a motor shaft taken along line 3-3 of FIG. 1A, according to the present invention.

A cross-sectional view of the electric motor 10a having second embodiments of the independently rotating HPMSC outer rotor 20a and the SC inner rotor 30a fixedly coupled to a motor shaft taken along line 2-2 of FIG. 1B, is shown in FIG. 12, and a cross-sectional view of the electric motor 10a taken along line 3-3 of FIG. 1A, is shown in FIG. 13. The SC inner rotor 30a does not include the slots 34 of the SC inner rotor 30.

Figures 14, 15:
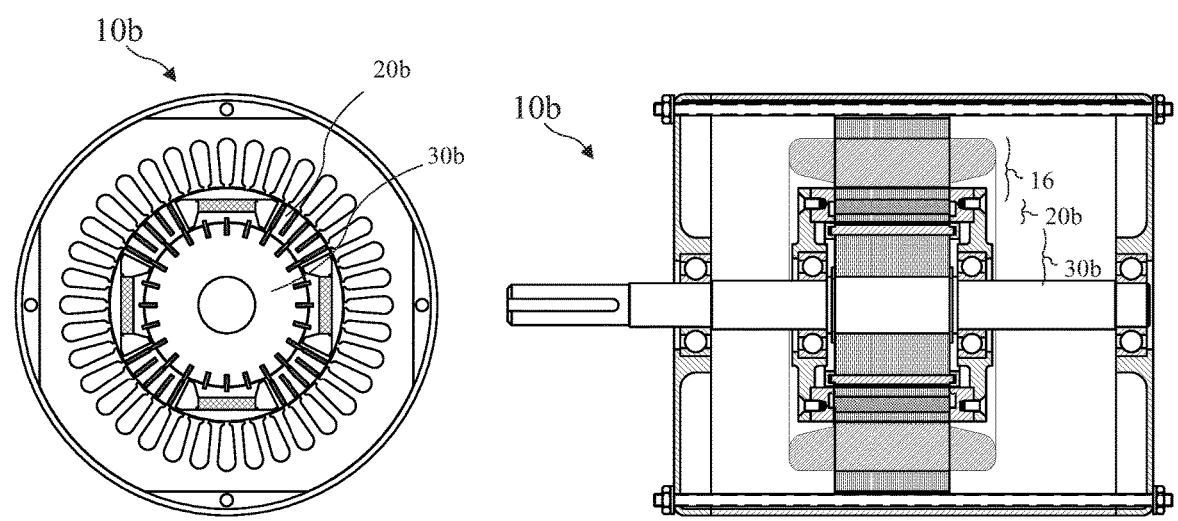
FIG. 14 shows a cross-sectional view of the electric motor having third embodiment of the independently rotating HPMSC outer rotor and the SC inner rotor fixedly coupled to a motor shaft taken along line 2-2 of FIG. 1B, according to the present invention.
FIG. 15 shows a cross-sectional view of the electric motor having the third embodiments of the independently rotating HPMSC outer rotor and the SC inner rotor fixedly coupled to a motor shaft taken along line 3-3 of FIG. 1A, according to the present invention.

A cross-sectional view of the electric motor 10b having third embodiment of the independently rotating HPMSC outer rotor 20b and the SC inner rotor 30b fixedly coupled to a motor shaft taken along line 2-2 of FIG. 1B, is shown in FIG. 14 and a cross-sectional view of the electric motor 10b taken along line 3-3 of FIG. 1A, is shown in FIG. 15. The SC inner rotor 30b does not include the slots 34 of the SC inner rotor 30.

Figure 16:
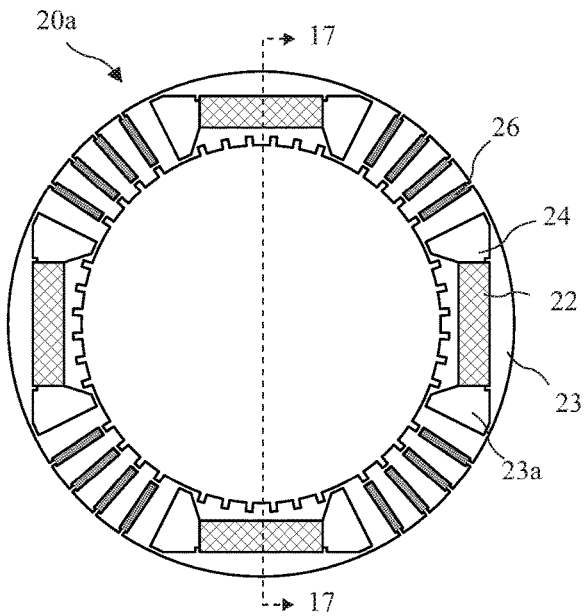
FIG. 16 shows a cross-sectional view of the second embodiment of the independently rotating HPMSC outer rotor taken along line 2-2 of FIG. 1B, according to the present invention.
Figure 17:
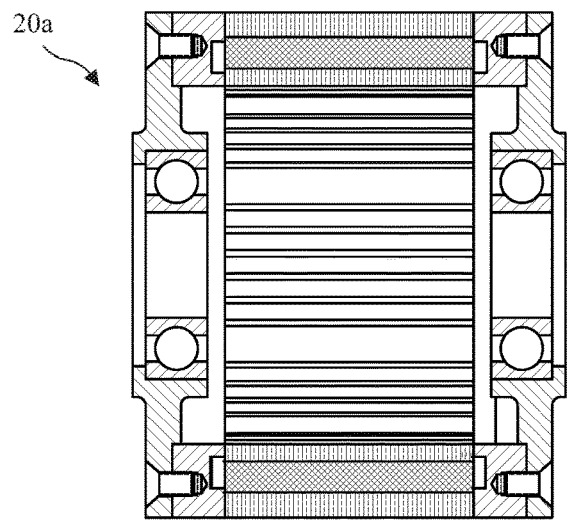
FIG. 17 shows a cross-sectional view of the second embodiment of the independently rotating HPMSC outer rotor taken along line 17-17 of FIG. 16, according to the present invention.

A cross-sectional view of the second embodiment of the independently rotating HPMSC outer rotor 20a taken along line 2-2 of FIG. 1B, is shown in FIG. 16 and a cross-sectional view of the rotor 20a taken along line 17-17 of FIG. 16, is shown in FIG. 17. The HPMSC outer rotor 20a includes four bars 26 between consecutive magnets 22.

Figure 18:
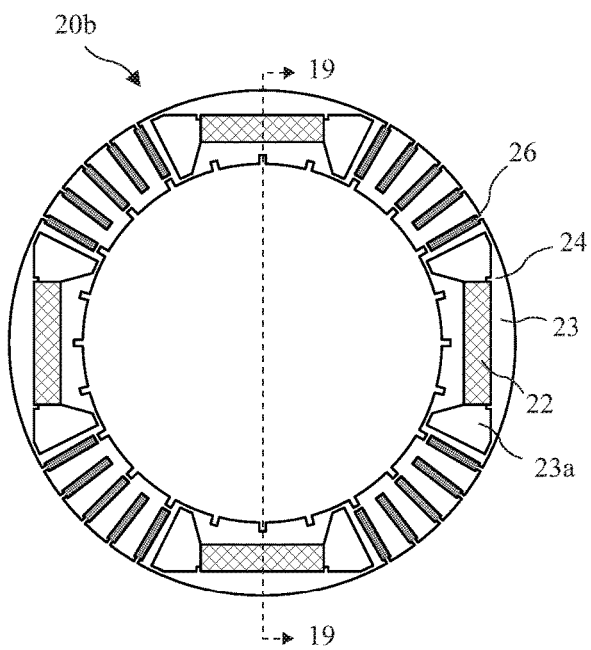
FIG. 18 shows a cross-sectional view of the third embodiment of the independently rotating HPMSC outer rotor taken along line 2-2 of FIG. 1B, according to the present invention.
Figure 19:
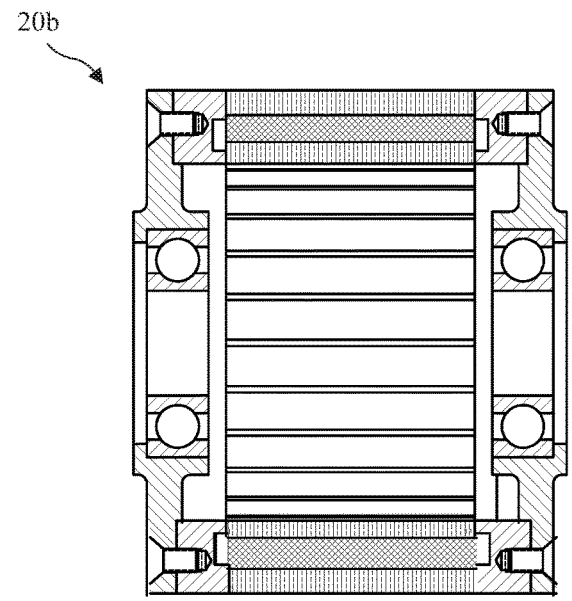
FIG. 19 shows a cross-sectional view of the third embodiment of the independently rotating HPMSC outer rotor taken along line 19-19 of FIG. 18, according to the present invention.

A cross-sectional view of the third embodiment of the independently rotating HPMSC outer rotor 20b taken along line 2-2 of FIG. 1B, is shown in FIG. 18 and a cross-sectional view of the HPMSC outer rotor 20b taken along line 19-19 of FIG. 18, is shown in FIG. 19. The HPMSC outer rotor 20b includes five bars 26 between consecutive magnets 22.

Figure 20:
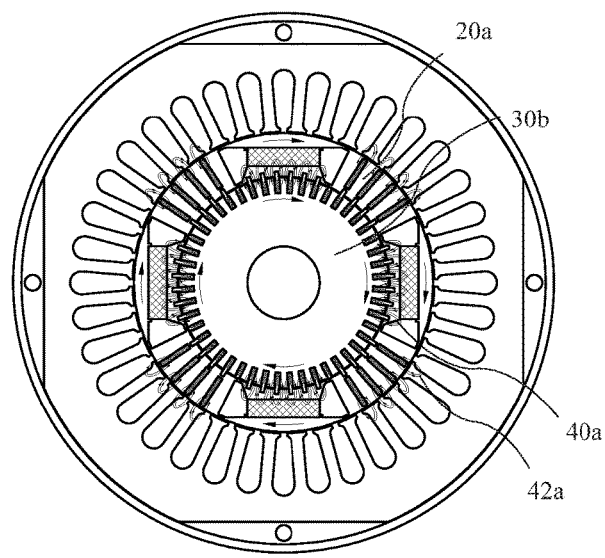
FIG. 20 shows a cross-sectional view of the second embodiment of the electric motor having the independently rotating HPMSC outer rotor and the SC inner rotor fixedly coupled to a motor shaft, showing magnetic field lines at startup taken along line 2-2 of FIG. 1B, according to the present invention.
Figure 21:
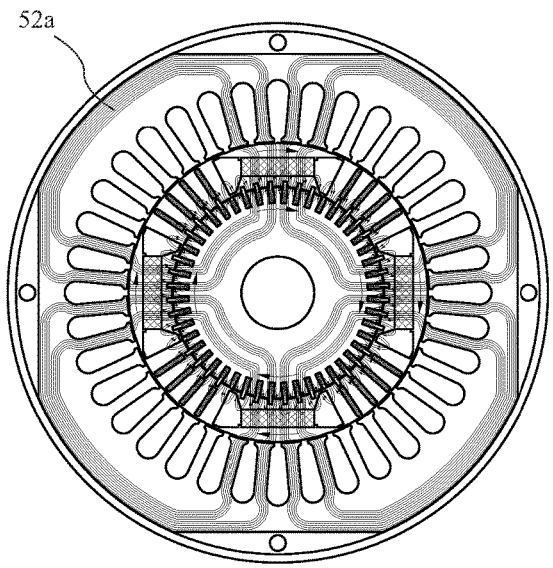
FIG. 21 shows a cross-sectional view of the second embodiment of the electric motor having the independently rotating HPMSC outer rotor and the SC inner rotor fixedly coupled to a motor shaft, showing magnetic field lines at synchronous speed taken along line 2-2 of FIG. 1B, according to the present invention.

A cross-sectional view of the second embodiment of the electric motor 10a showing magnetic field lines 40a and 42a at startup taken along line 2-2 of FIG. 1B, is shown in FIG. 20 and a cross-sectional view of the electric motor 10a showing magnetic field lines 52a at synchronous speed taken along line 2-2 of FIG. 1B, is shown in FIG. 21. The magnetic field lines transition similarly to the transitions described in FIGS. 10 and 11.

Figure 22:
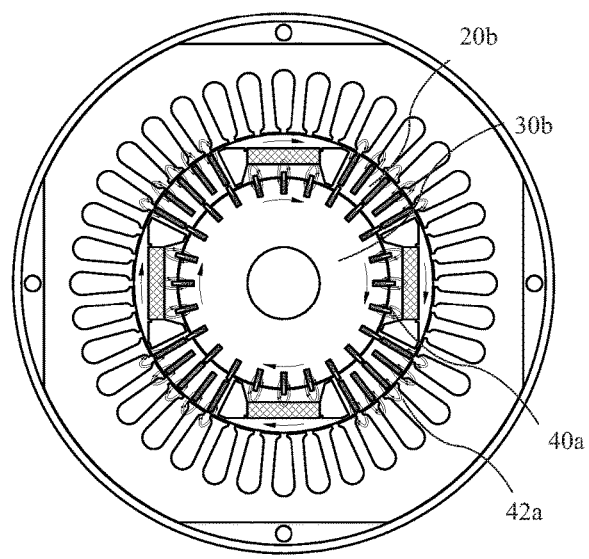
FIG. 22 shows a cross-sectional view of the third embodiment of the electric motor having the independently rotating HPMSC outer rotor and the SC inner rotor fixedly coupled to a motor shaft at startup taken along line 2-2 of FIG. 1B, according to the present invention.
Figure 23:
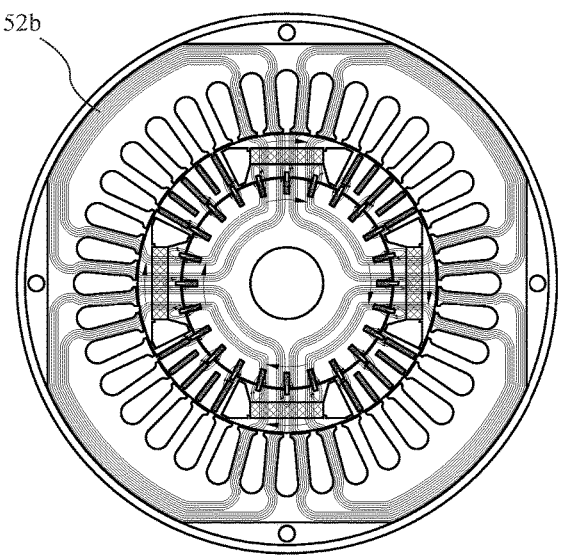
FIG. 23 shows a cross-sectional view of the third embodiment of the electric motor having the independently rotating HPMSC outer rotor and the SC inner rotor fixedly coupled to a motor shaft at synchronous speed taken along line 2-2 of FIG. 1B, according to the present invention.

A cross-sectional view of the electric motor 10b showing magnetic field lines 40b and 42b at startup, taken along line 2-2 of FIG. 1B, is shown in FIG. 22, and a cross-sectional view of the electric motor 10b showing magnetic field lines at synchronous speed taken along line 2-2 of FIG. 1B, is shown in FIG. 23. The magnetic field lines transition similarly to the transitions described in FIGS. 10 and 11.

A first embodiment of the invention thus discloses a clutch-less hybrid squirrel cage/permanent magnet motor comprising:

a motor housing;

a stator fixed to the motor housing and producing a rotating stator magnetic field;

a motor shaft rotatably connected to the motor housing and extending from at least one end of the motor housing for attachment to a load;

a hybrid squirrel cage/permanent magnet rotor residing coaxial with the motor shaft and having a first rotor core, a number N of angularly spaced apart permanent magnets embedded in the rotor core, non-ferrous gaps in the rotor core present at ends of each permanent magnet, and first bars embedded in the rotor core, the hybrid squirrel cage/permanent magnet rotor capable of rotating independently of the motor shaft; and a squirrel cage rotor residing coaxial with the motor shaft and having a second rotor core, second bars embedded in the second rotor core, and the number N uniformly angularly spaced apart axially running slots on a surface of the second rotor core facing the hybrid squirrel cage/permanent magnet rotor, and the squirrel cage rotor rotationally fixed to the motor shaft.

The first embodiment may further include:

the squirrel cage rotor is an inner squirrel cage rotor residing inside the hybrid squirrel cage/permanent magnet rotor;

the squirrel cage rotor is axially aligned with the hybrid squirrel cage/permanent magnet rotor;

at startup the first bars of the hybrid squirrel cage/permanent magnet rotor inductively cooperate with the rotating stator magnetic field to apply torque to the hybrid squirrel cage/permanent magnet rotor, and the second bars of the squirrel cage rotor shunt the permanent magnets of the hybrid squirrel cage/permanent magnet rotor, to facilitate initial acceleration of the hybrid squirrel cage/permanent magnet rotor;

as the hybrid squirrel cage/permanent magnet rotor accelerates, the permanent magnets create a rotating magnetic field inductively cooperating with the second bars of the squirrel cage rotor, and accelerating the squirrel cage rotor;

as both the hybrid squirrel cage/permanent magnet rotor and the squirrel cage rotor approach synchronous operation:

the slots on the surface of the squirrel cage rotor cooperate with the permanent magnets and the non-ferrous gaps at ends of each permanent magnet of the hybrid squirrel cage/permanent magnet rotor to create salient poles magnetically coupling rotation of the squirrel cage rotor to the hybrid squirrel cage/permanent magnet rotor; and the rotating stator magnetic field couples with the permanent magnets, passing through the permanent magnets into the squirrel cage inner rotor, in synchronous operation with the permanent magnets;

the permanent magnets comprise an even number of permanent magnets;

the hybrid squirrel cage/permanent magnet rotor includes end caps holding bearings, the bearings riding on the motor shaft;

the combined permanent magnets and gaps at ends of the permanent magnets in the hybrid squirrel cage/permanent magnet rotor are angularly spaced apart by angular segments S, and the first bars in the hybrid squirrel cage/permanent magnet rotor reside uniformly angularly spaced apart in the angular segments S;

the first bars in the hybrid squirrel cage/permanent magnet rotor are at a common radius; or the hybrid squirrel cage/permanent magnet outer rotor resides between the squirrel cage rotor and the stator.

The first embodiment may further be described as a method for clutch-less hybrid squirrel cage/permanent magnet motor operation comprising:

providing an AC signal to a fixed rotor;

creating a rotating stator magnetic field cooperating with a two part rotor comprising:

a hybrid squirrel cage/permanent magnet outer rotor residing coaxial with a motor shaft and having a first rotor core, a number N of angularly spaced apart permanent magnets embedded in the rotor core, non-ferrous gaps in the rotor core present at ends of each permanent magnet, and first bars embedded in the rotor core, the hybrid squirrel cage/permanent magnet rotor capable of rotating independently of the motor shaft; and a squirrel cage inner rotor residing coaxial with the motor shaft and having a second rotor core, second bars embedded in the second rotor core, and the number N uniformly angularly spaced apart axially running slots on a surface of the second rotor core facing the hybrid squirrel cage/permanent magnet rotor, and the squirrel cage rotor rotationally fixed to the motor shaft;

the rotating stator magnetic field inductively cooperating with the first bars of the hybrid squirrel cage/permanent magnet rotor to create torque on the hybrid squirrel cage/permanent magnet rotor;

shunting a magnetic field of the permanent magnets by the second bars residing of the squirrel cage rotor, thereby reducing an effect of preventing acceleration of the hybrid squirrel cage/permanent magnet rotor due to the permanent magnets;

accelerating the hybrid squirrel cage/permanent magnet rotor towards synchronous RPM;

creating a permanent magnet rotating permanent magnet field;

the rotating permanent magnet field inductively cooperating with the second bars of the squirrel cage rotor to create torque on the squirrel cage rotor;

as the hybrid squirrel cage/permanent magnet rotor and squirrel cage rotors approach synchronous RPM, the slots on the surface of the squirrel cage rotor cooperating with the permanent magnets and the non-ferrous gaps at ends of each permanent magnet of the hybrid squirrel cage/permanent magnet rotor to create salient poles magnetically coupling rotation of the squirrel cage rotor to the hybrid squirrel cage/permanent magnet rotor; and the rotating stator magnetic field coupling with the permanent magnets, passing through the permanent magnets into the squirrel cage inner rotor, in synchronous operation with the permanent magnets.

Figure 26:
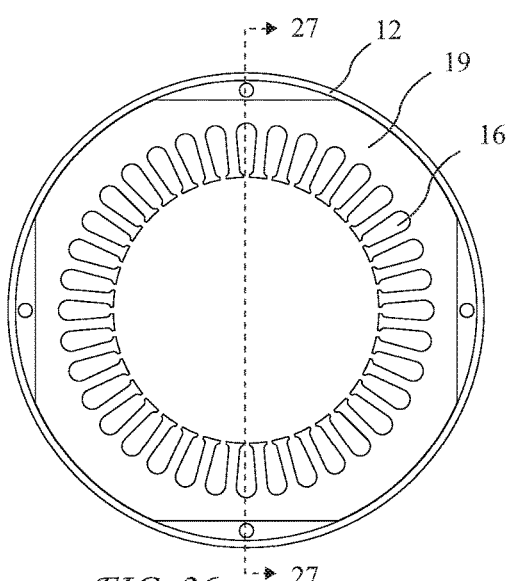
FIG. 26 shows a cross-sectional view of a housing and fixed stator portion of the second embodiment of the electric motor having the independently rotating SC outer rotor and the HPMSC inner rotor fixedly coupled to a motor shaft taken along line 2-2 of FIG. 1B, according to the present invention.
Figure 27:
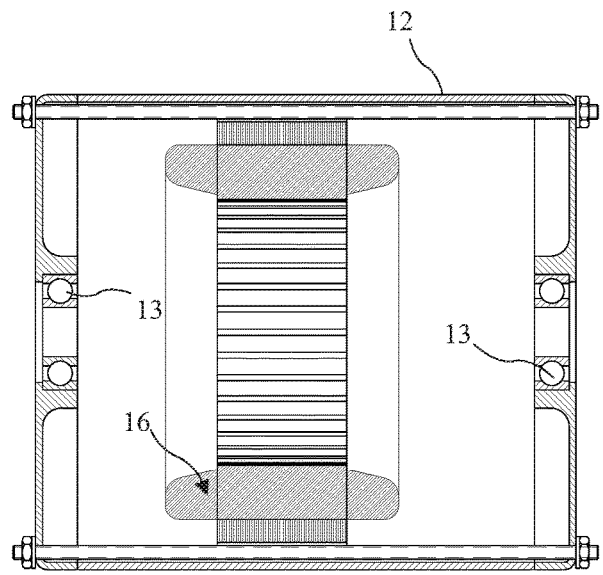
FIG. 27 shows a cross-sectional view of the housing and the fixed stator portion of the second embodiment of the electric motor having the independently rotating SC outer rotor and the HPMSC inner rotor fixedly coupled to a motor shaft taken along line 27-27 of FIG. 26, according to the present invention.
Figure 28:
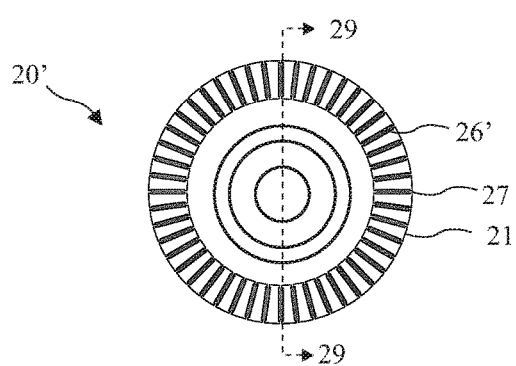
FIG. 28 shows a cross-sectional view of the independently rotating SC outer rotor of the second embodiment of the electric motor having the independently rotating SC outer rotor and the HPMSC inner rotor fixedly coupled to a motor shaft taken along line 2-2 of FIG. 1B, according to the present invention.
Figure 29:
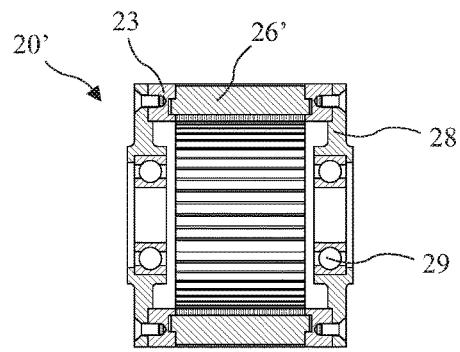
FIG. 29 shows a cross-sectional view of the independently rotating SC outer rotor of the second embodiment of the electric motor having the independently rotating SC outer rotor and the HPMSC inner rotor fixedly coupled to a motor shaft taken along line 29-29 of FIG. 28, according to the present invention.
Figure 30:
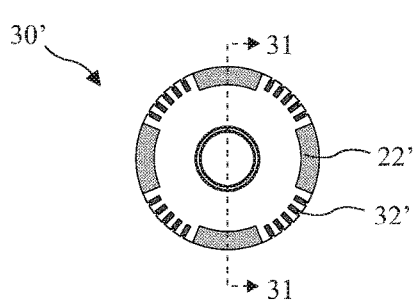
FIG. 30 shows a cross-sectional view of an HPMSC inner rotor of the second embodiment of the electric motor having the independently rotating SC outer rotor and the HPMSC inner rotor fixedly coupled to a motor shaft taken along line 2-2 of FIG. 1B, according to the present invention.
Figure 31:
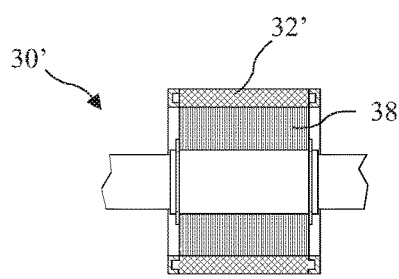
FIG. 31 shows a cross-sectional view of the HPMSC inner rotor of the second embodiment of the electric motor having the independently rotating SC outer rotor and the HPMSC inner rotor fixedly coupled to a motor shaft taken along line 31-31 of FIG. 30, according to the present invention.

A cross-sectional view of a second embodiment the electric motor 10' having the independently rotating SC outer rotor 20' and a PM inner rotor 30' fixedly coupled to a motor shaft taken along line 2-2 of FIG. 1B, is shown in FIG. 24 and a cross-sectional view of the second embodiment of the electric motor 10' taken along line 3-3 of FIG. 1A, is shown in FIG. 25. A cross-sectional view of a housing 12 and the fixed stator portion 16 of the second embodiment of the electric motor 10' taken along line 2-2 of FIG. 1B, is shown in FIG. 26, a cross-sectional view of the housing 12 and the fixed stator portion 16 of the second embodiment of the electric motor 10' taken along line 27-27 of FIG. 26, is shown in FIG. 27, a cross-sectional view of the independently rotating SC outer rotor 20' of the second embodiment of the electric motor 10' taken along line 2-2 of FIG. 1B, is shown in FIG. 28, a cross-sectional view of the independently rotating SC outer rotor 20' taken along line 29-29 of FIG. 28, is shown in FIG. 29, a cross-sectional view of an SC inner rotor 30' taken along line 2-2 of FIG. 1B, is shown in FIG. 30, and a cross-sectional view of the SC inner rotor 30' taken along line 31-31 of FIG. 30, is shown in FIG. 31.

The SC outer rotor 20' includes first bars 26' and small gaps 27 between the bars 26' and the surface 21 of the SC outer rotor 20'. The first bars 26' initially cooperate with the rotating stator magnetic field to inductively accelerate the SC outer rotor, and later cooperate with the permanent magnets. The gaps 21 may be air gaps or a non ferrous material. If no gaps 21 are present, an iron bridge may result diminishing the inductive effect by creating flux leakage between bars 26' acting as poles as the polarities switch back and forth during start up when rotor frequencies are highest reducing acceleration of the SC outer rotor, however, some iron bridging may be acceptable and a motor according to the present invention experiencing some iron bridging is intended to come within the scope of the present invention.

The PM inner rotor 30' includes permanent magnets 22' and may include second bars 32'. As acceleration of the SC outer rotor creates a rotor frequency between the inner and outer rotors, inductive cooperation between the first bars 26' and the permanent magnets 22' accelerates the inner rotor 30' towards synchronous RPM.

Figure 32:
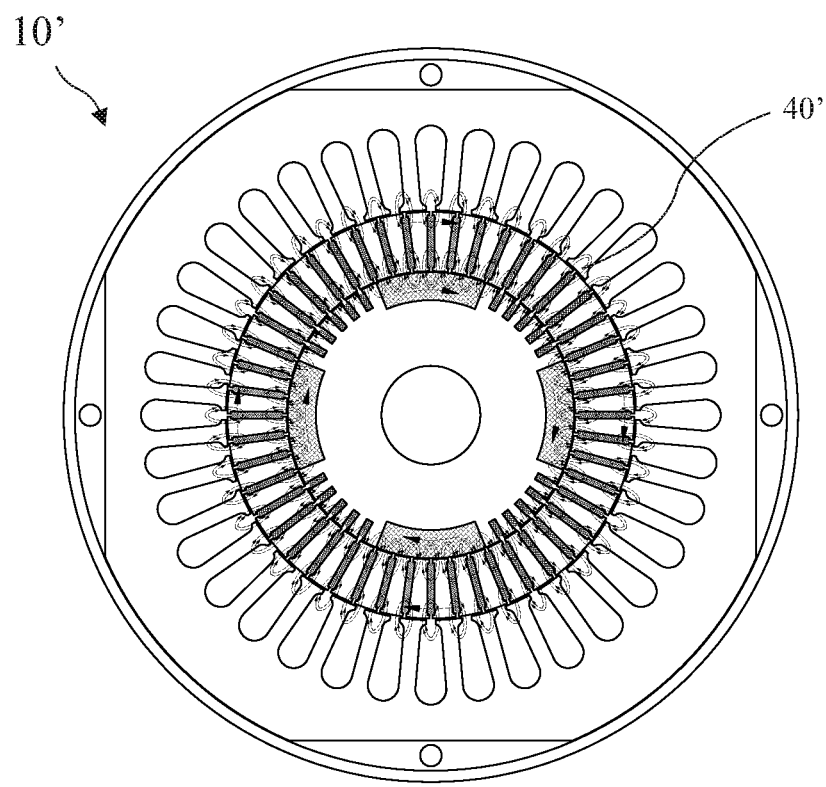
FIG. 32 shows a cross-sectional view of the second embodiment of the electric motor, showing magnetic field lines at startup, taken along line 2-2 of FIG. 1B, according to the present invention.
Figure 33:
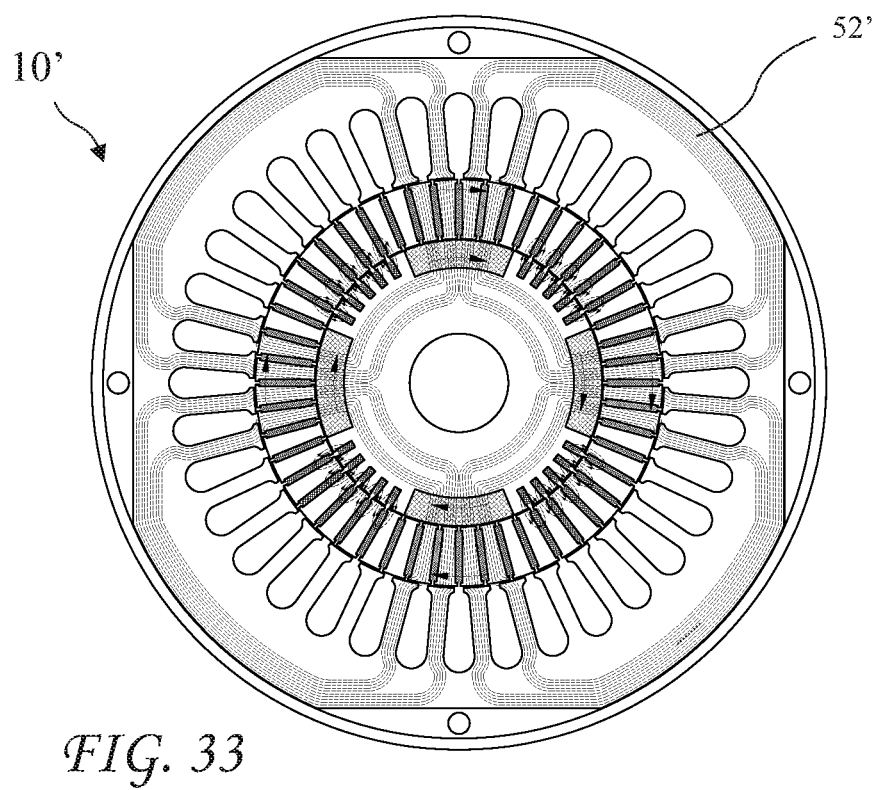
FIG. 33 shows a cross-sectional view of the second embodiment of the electric motor, showing magnetic field lines at synchronous speed, taken along line 2-2 of FIG. 1B, according to the present invention.

A cross-sectional view of the second embodiment of the electric motor 10', showing magnetic field lines at startup, taken along line 2-2 of FIG. 1B, is shown in FIG. 32 and a cross-sectional view of the second embodiment of the electric motor 10', showing magnetic field lines at synchronous speed, taken along line 2-2 of FIG. 1B is shown in FIG. 33. At start up, when frequencies (e.g., the difference between the stator magnetic field RPM and rotor RPM) are highest, the magnetic flux lines 40' tend to stay close to surface, this is called the skin or surface effect. The electric motor 10' takes advantage of the skin effect for starting because the rotating stator flux cooperates with the first bars in the SC outer rotor which is not substantially affected by the permanent magnet flux from the PM inner rotor flux because the skin effect reduces the cooperation of the permanent magnets in the PM inner rotor with the SC outer rotor.

At near synchronous the rotor frequencies are low, and at synchronous operation the rotor frequency is 0, and the magnetic flux lines 52' are not in shear and penetrate deep into rotor iron providing a deep bar effect. As the SC outer rotor RPM increases, the skin effect also comes into play coupling the first bars 26' in the SC outer rotor 20' to the permanent magnets 22' in the PM inner rotor 30' as the frequency between the SC outer rotor 20' and the PM inner rotor 30' increases, producing torque to accelerate the PM inner rotor 30'.

Figure 34:
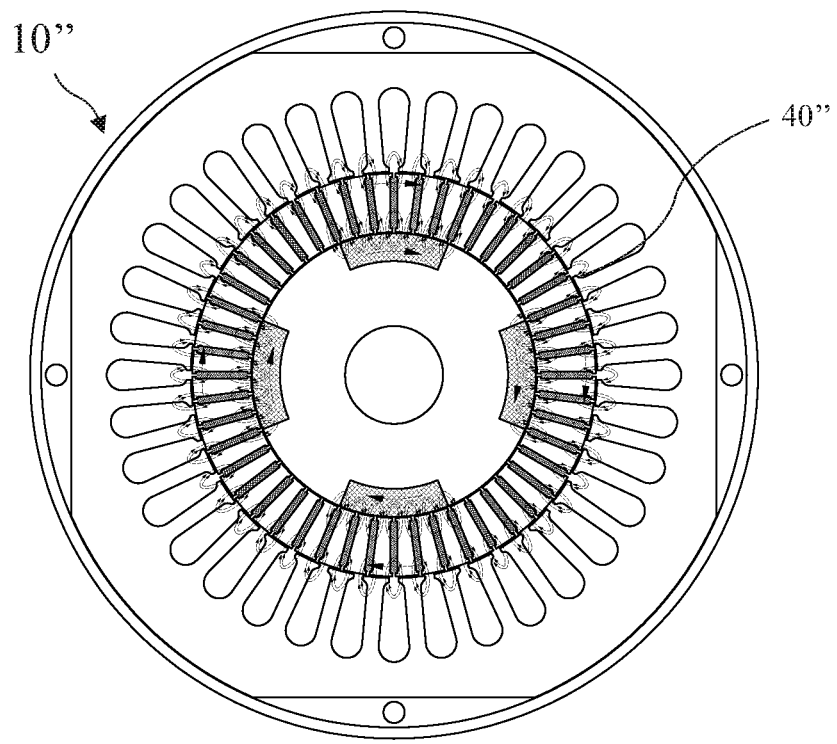
FIG. 34 shows a cross-sectional view of the second embodiment of the electric motor having no bars in the inner rotor showing magnetic field lines at startup taken along line 2-2 of FIG. 1B, according to the present invention.
Figure 35:
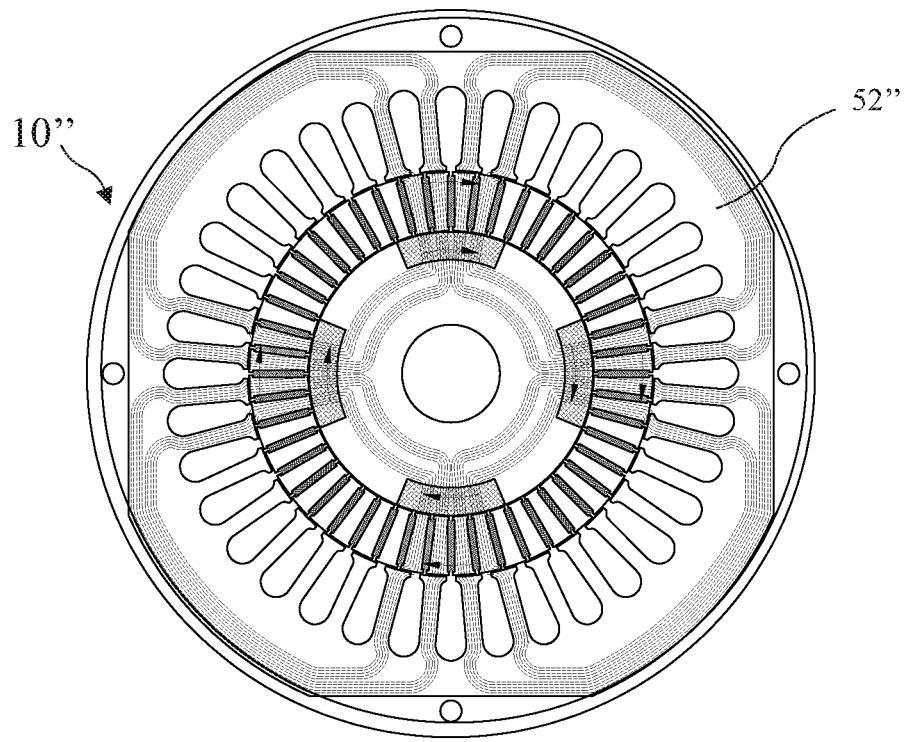
FIG. 35 shows a cross-sectional view of the second embodiment of the electric motor having no bars in the inner rotor showing magnetic field lines at synchronous speed taken along line 2-2 of FIG. 1B, according to the present invention.

A cross-sectional view of the second embodiment of the electric motor 10" having no bars in the inner rotor, showing magnetic field lines, at startup, taken along line 2-2 of FIG. 1B, is shown in FIG. 34, and a cross-sectional view of the second embodiment of the electric motor 10" taken along line 2-2 of FIG. 1B, showing magnetic field lines at synchronous speed, is shown in FIG. 35. The magnetic field lines 40" and 52" are similar to the magnetic field lines 40' and 52' with a difference being an absence of lines between the first bars 26' and second bars 32' which are no longer present. The electric motor 10" provides an advantage of a more simple and less expensive design compared to the electric motor 10'.

A first embodiment of a PM inner rotor 30'a is shown in FIG. 36a, a second embodiment of a PM inner rotor 30'b is shown in FIG. 36B, and a third embodiment of a PM inner rotor 30'c is shown in FIG. 36C. The PM inner rotor 30'a includes two permanent magnets 22', the PM inner rotor 30'b includes four permanent magnets 22', and the PM inner rotor 30'c includes six permanent magnets 22'. Second bars 32' may or may not reside between the permanent magnets 22'.

A fourth embodiment of a PM inner rotor 30'd is shown in FIG. 37A and a fifth embodiment of a PM inner rotor 30'e is shown in FIG. 37B. A PM inner rotor 30d includes two permanent magnets 22" in contact, and a PM inner rotor 30e includes four permanent magnets 22" in contact. The permanent magnets 22" may be low cost ferrite magnets.

Figure 38A:
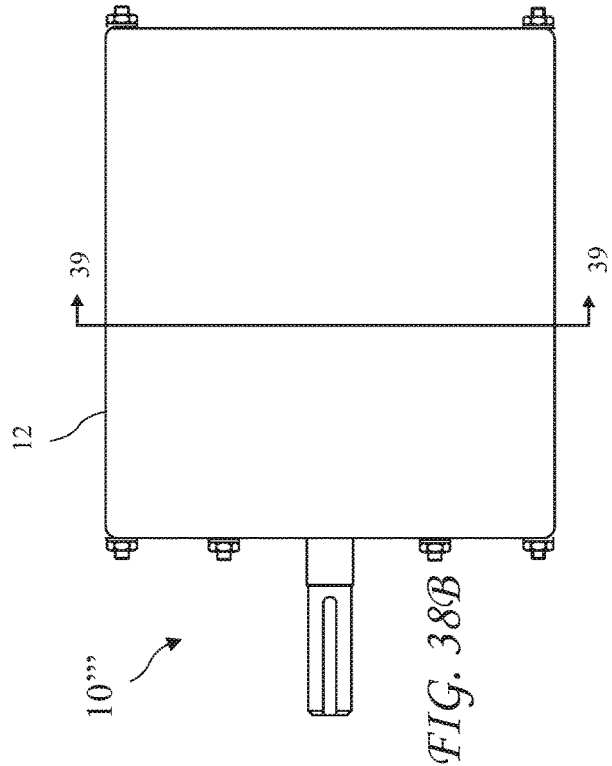
FIG. 38A shows an end view of an electric motor having an independently rotating Hybrid Permanent Magnet/squirrel Cage (HPMSC) outer rotor and a Squirrel Cage (SC) inner rotor fixedly coupled to a motor shaft, according to the present invention.
Figure 38B:
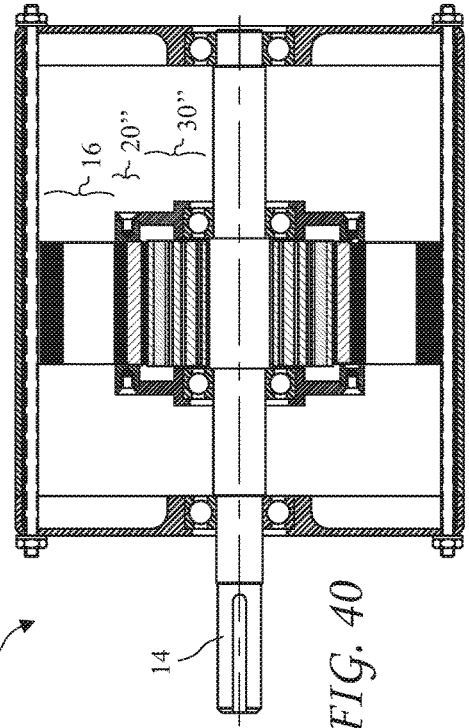
FIG. 38B shows a side view of the electric motor having an independently rotating HPMSC outer rotor and a Squirrel Cage (SC) inner rotor fixedly coupled to a motor shaft, according to the present invention.
Figure 39:
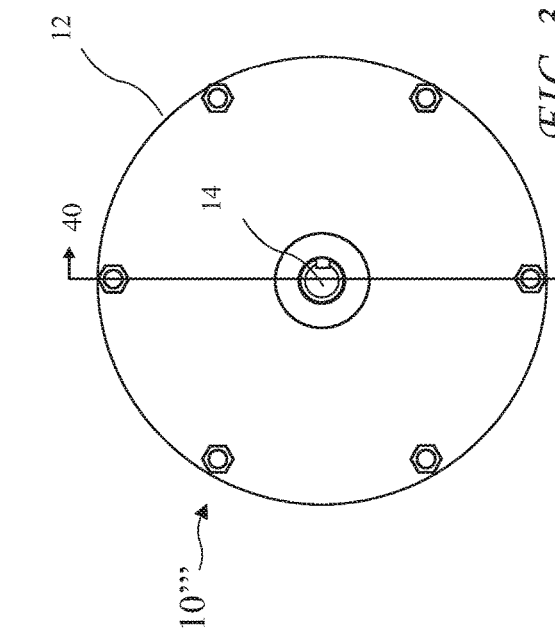
FIG. 39 shows a cross-sectional view of the electric motor having the independently rotating HPMSC outer rotor and the SC inner rotor fixedly coupled to a motor shaft taken along line 39-39 of FIG. 38B, according to the present invention.
Figure 40:
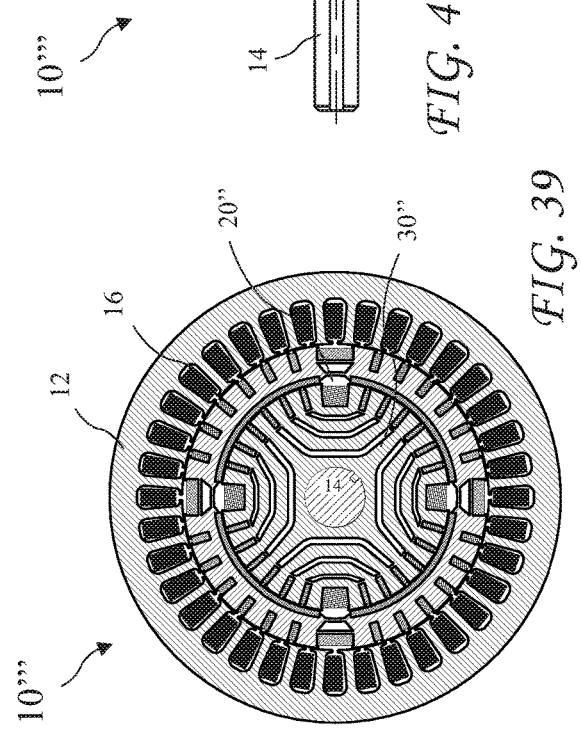
FIG. 40 shows a cross-sectional view of the electric motor having the independently rotating HPMSC outer rotor and the SC inner rotor fixedly coupled to a motor shaft taken along line 40-40 of FIG. 38A, according to the present invention.

An end view of another embodiment of an electric motor 10''' having an independently rotating Hybrid Permanent Magnet/squirrel Cage (HPMSC) outer rotor 20" and a Squirrel Cage (SC) inner rotor 30" fixedly coupled to a motor shaft 14, according to the present invention is shown in FIG. 38A, and a side view of the electric motor 10''' is shown in FIG. 38B. A cross-sectional view of the electric motor 10''' taken along line 39-39 of FIG. 38B, is shown in FIG. 39 and a cross-sectional view of the electric motor 10''' taken along line 40-40 of FIG. 38A is shown in FIG. 40. The electric motor 10''' includes a housing 12, a stator portion 16 fixedly coupled to the housing 12, the independently rotating HPMSC outer rotor 20" riding on bearings 29 (see FIG. 44), and the SC inner rotor 30" fixed to the motor shaft 14. The HPMSC outer rotor 20" is mounted to the motor shaft 14 by bearings and is not mechanically coupled to rotate with the motor shaft 14.

Figure 41:
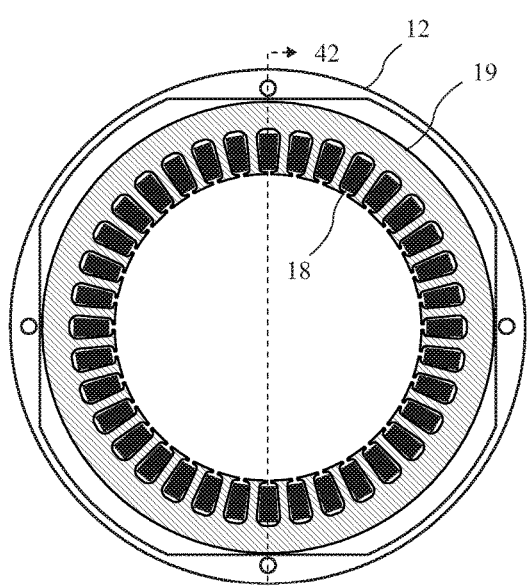
FIG. 41 shows a cross-sectional view of a housing and fixed stator portion of the electric motor having the independently rotating HPMSC outer rotor and the SC inner rotor fixedly coupled to a motor shaft taken along line 39-39 of FIG. 38B, according to the present invention.
Figure 42:
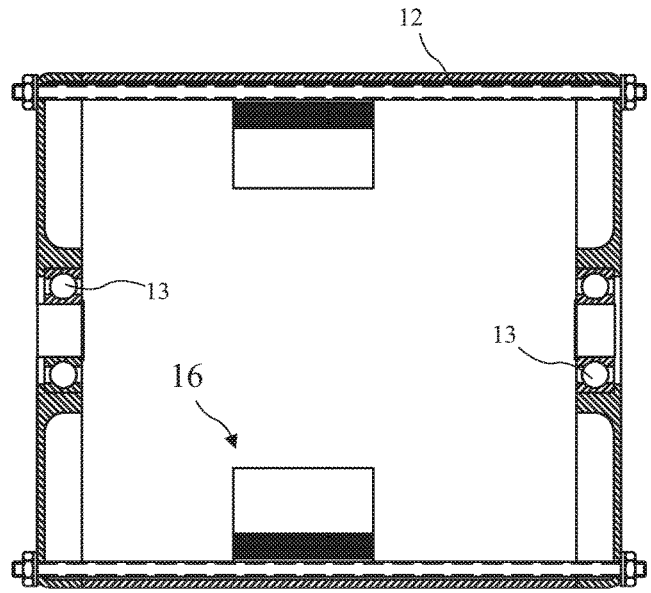
FIG. 42 shows a cross-sectional view of the housing and the fixed stator portion of the electric motor having the independently rotating HPMSC outer rotor and the SC inner rotor fixedly coupled to a motor shaft taken along line 42-42 of FIG. 41, according to the present invention.

A cross-sectional view of the housing 12 and fixed stator portion 16 of the electric motor 10''' taken along line 39-39 of FIG. 38B, is shown in FIG. 41 and a cross-sectional view of the housing 12 and the fixed stator portion 16 taken along line 42-42 of FIG. 41, is shown in FIG. 42. Fixed stator windings 18 reside in a stator core 19. The stator windings 18 create a rotating stator magnetic field when provided with an Alternating Current (AC) signal. The housing 12 includes bearings 13 for carrying the shaft 14.

Figure 43:
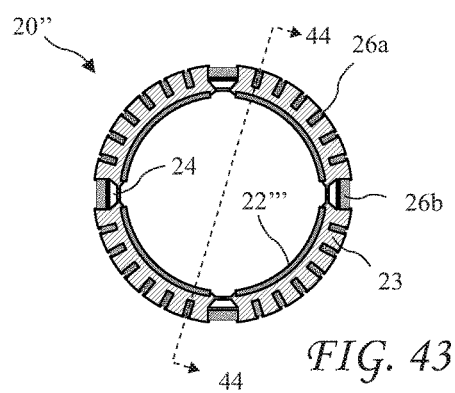
FIG. 43 shows a cross-sectional view of the independently rotating HPMSC outer rotor of the electric motor having the independently rotating HPMSC outer rotor and the SC inner rotor fixedly coupled to a motor shaft taken along line 39-39 of FIG. 38B, according to the present invention.
Figure 44:
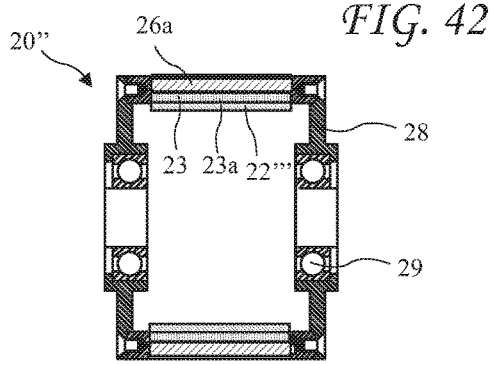
FIG. 44 shows a cross-sectional view of the independently rotating HPMSC outer rotor of the electric motor having the independently rotating HPMSC outer rotor and the SC inner rotor fixedly coupled to a motor shaft taken along line 44-44 of FIG. 43, according to the present invention.

A cross-sectional view of the independently rotating HPMSC outer rotor 20" taken along line 39-39 of FIG. 38B, is shown in FIG. 43 and a cross-sectional view of the independently rotating HPMSC outer rotor 20" taken along line 44-44 of FIG. 43, is shown in FIG. 44. The HPMSC outer rotor 20" includes angularly spaced apart permanent magnets 22''' on an interior of the HPMSC outer rotor 20" and angularly spaced apart first bars 26a and 26b residing proximal to an outer surface of the HPMSC outer rotor 20" embedded in a core (or laminate) 23. The HPMSC outer rotor 20" may include any even number of permanent magnets 22''', for example, two, four, six, eight, etc. permanent magnets 22''' (see FIGS. 49A-49D). Non-ferrous voids 24 in the rotor core 23 are present between the permanent magnets 22'''. The voids 24 are air gaps or non ferrous material to provide flux barriers, if a ferrous material was present between the magnets 22''', magnetic flux would curl back into the magnets 22''', shorting much of the magnetic flux lines back into the magnets 22'''. The core 23 is preferably a laminated core and thin laminates 23a of the core 23 forming the core 23 may result in flux leakage. The thickness of the laminates 23a is preferably optimized to minimize the leakage while maintaining mechanical integrity of the rotor core laminates 23. The bars 26a and 26b are preferably evenly angularly spaced apart. The magnets 22''' are preferably neodymium magnets bonded to an inside surface of the rotor core 23.

The HPMSC outer rotor 20" may include only minor bars 26a but preferably also includes larger major bars 26b providing structural strength. The major bars 26b preferably reside angularly (i.e., may be spaced out radially) between the permanent magnets 22''' and the number of major bars 26b preferably us the same as the number of magnets 22'''. The voids (or non-ferrous gaps) 24 preferably reside under the major bars 26b. The bars 26a and 26b are preferably made of a light weight material, for example, aluminum. The magnets 22''' are also preferably made of a light weight material, and are preferably rare earth magnets allowing lighter weight for a given magnet strength. The light weight of the bars 26a and 26, and the magnets 22''', reduce the moment of inertia of the HPMSC outer rotor 20" allowing the HPMSC outer rotor 20" to overcome braking and pulsating torques caused by the permanent magnets 22''', thus allowing stronger permanent magnets 22''' and greater efficiency than a Line Start Permanent Magnet (LSPM) motor. A balance between bars 26a and 26b resistance and rotor core 23 saturation m ay be optimized and the shape, number and dimensions of the bars 26a and 26b may have great effect on performance, for example, motor startup.

Rotor end caps 28 are attached to opposite ends of the HPMSC outer rotor 20" and include bearings 29 allowing the HPMSC outer rotor 20" to rotate freely on the motor shaft 14. The bearings 29 are preferably low friction bearings (for example, ball bearings or roller bearings), but may simple be bushings (for example, bronze bushings, oilite bushings, or Kevlar® bushings). The HPMSC outer rotor 20" is not mechanically coupled to rotate with the SC inner rotor 30" or the motor shaft 14 at any time, other than some parasitic coupling which may exist in the bearings 29.

Figure 45:
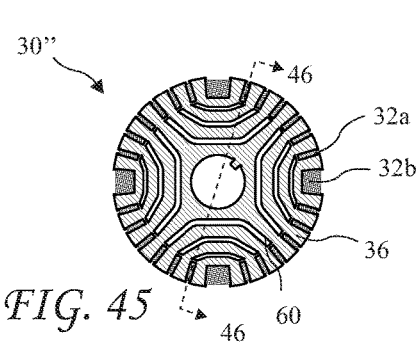
FIG. 45 shows a cross-sectional view of an SC inner rotor of the electric motor having the independently rotating HPMSC outer rotor and the SC inner rotor fixedly coupled to a motor shaft taken along line 39-39 of FIG. 38B, according to the present invention.
Figure 46:
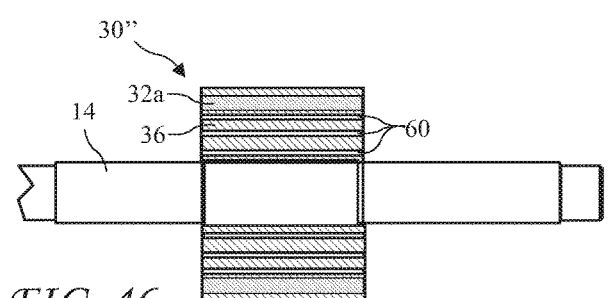
FIG. 46 shows a cross-sectional view of the SC inner rotor of the electric motor having the independently rotating HPMSC outer rotor and the SC inner rotor fixedly coupled to a motor shaft taken along line 46-46 of FIG. 45, according to the present invention.

A cross-sectional view of the SC inner rotor 30" of the electric motor 10''' taken along line 39-39 of FIG. 38B, is shown in FIG. 45 and a cross-sectional view of the SC inner rotor 30" of the electric motor 10''' taken along line 46-46 of FIG. 45, is shown in FIG. 46. The SC inner rotor 30" is fixed to the motor shaft 14 and cooperates with the HPMSC outer rotor 20" to magnetically couple the HPMSC outer rotor 20" to the motor shaft 14 at synchronous speed. Second minor bars 32a and major bars 32b reside in a second rotor core (or laminate) 36. The bars 32a and 32b are not necessarily, but are preferably evenly angularly spaced apart. The major bars 32b add structural strength to the SC inner rotor 30" and help direct lines of magnetic flux 50 (see FIG. 48B).

Figure 47A:
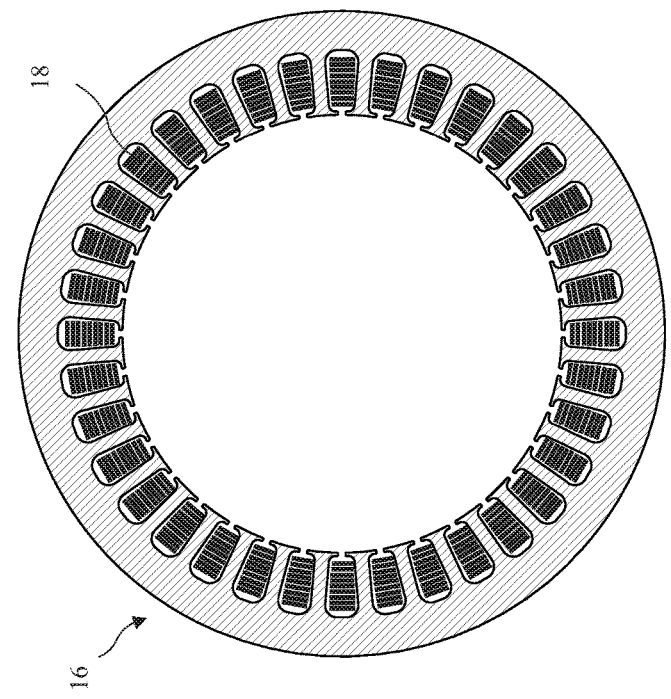
FIG. 47A shows a cross-sectional view of a stator of the sixth embodiment of the motor having a hybrid inductive/permanent magnet outer rotor according to the present invention.
Figure 47C:
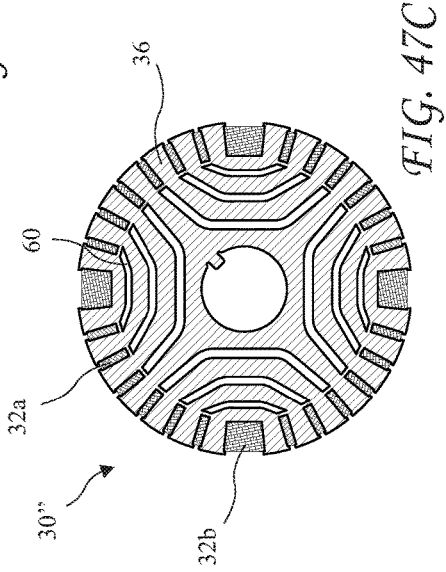
FIG. 47C shows a cross-sectional view of an inner inductive rotor of the sixth embodiment of the motor having a hybrid inductive/permanent magnet outer rotor according to the present invention.
Figure 47:
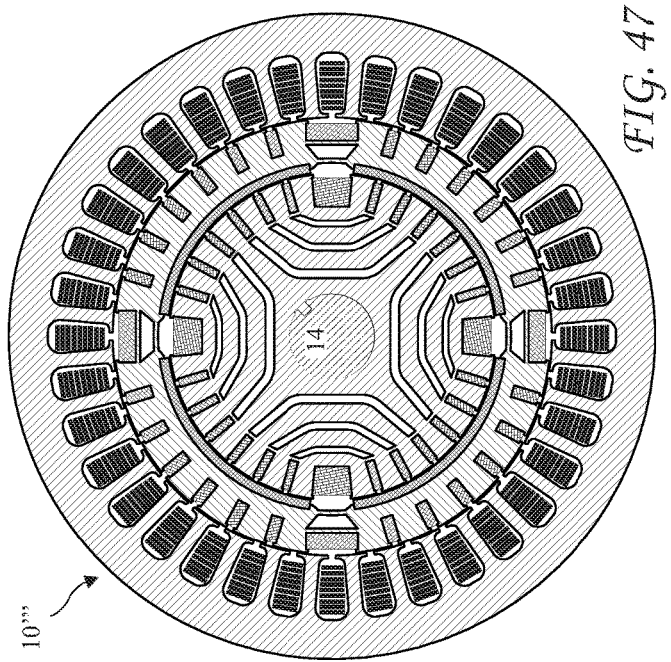
FIG. 47 shows a cross-sectional view of a sixth embodiment of a motor having a hybrid inductive/permanent magnet outer rotor according to the present invention.
Figure 47B:
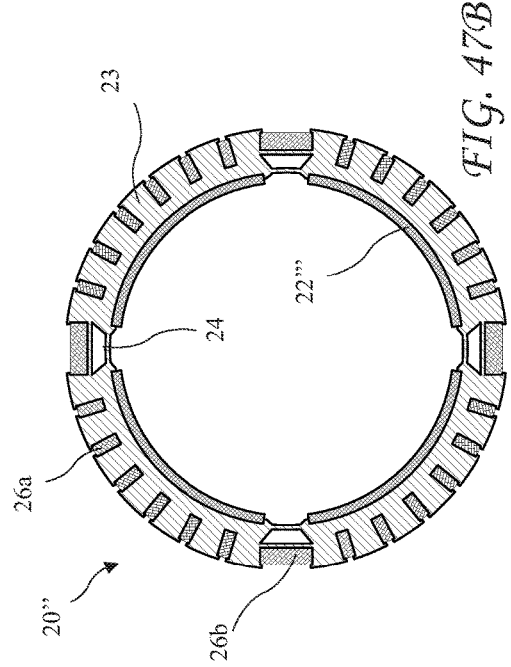
FIG. 47B shows a cross-sectional view of the hybrid inductive/permanent magnet outer rotor of the sixth embodiment of the motor having a hybrid inductive/permanent magnet outer rotor according to the present invention.

A detailed cross-sectional view of the electric motor 10''' is shown in FIG. 47, a cross-sectional view of a stator 16 of the electric motor 10''' is shown in FIG. 47A, a cross-sectional view of the HPMSC outer rotor 20" of the electric motor 10''' is shown in FIG. 47B, and a cross-sectional view of a SC inner rotor 30" of the electric motor 10''' is shown in FIG. 47C. The stator 16 includes stator windings 18 in a laminate 19 creating a rotating stator magnetic field.

The HPMSC outer rotor 20" is rotationally coupled to the motor shaft through bearings 29 (see FIG. 44) and includes the minor squirrel cage bars 26a and the major squirrel cage bars 26b, the bars 26a and 26b are em bedded in the laminate 23. The permanent magnets 22''' reside on an inner surface of the HPMSC outer rotor 20" facing the SC inner rotor 30".

The SC inner rotor 30" includes the minor bars 32a and the major bars 32b. The flux barriers 60 follow a concave path through the laminate 36 and outer ends of the flux barriers 60 are generally aligned with the minor bars 32a. Both the minor bars 32a and the major bars 32b are slightly recessed into the laminate 36.

Figure 48B:
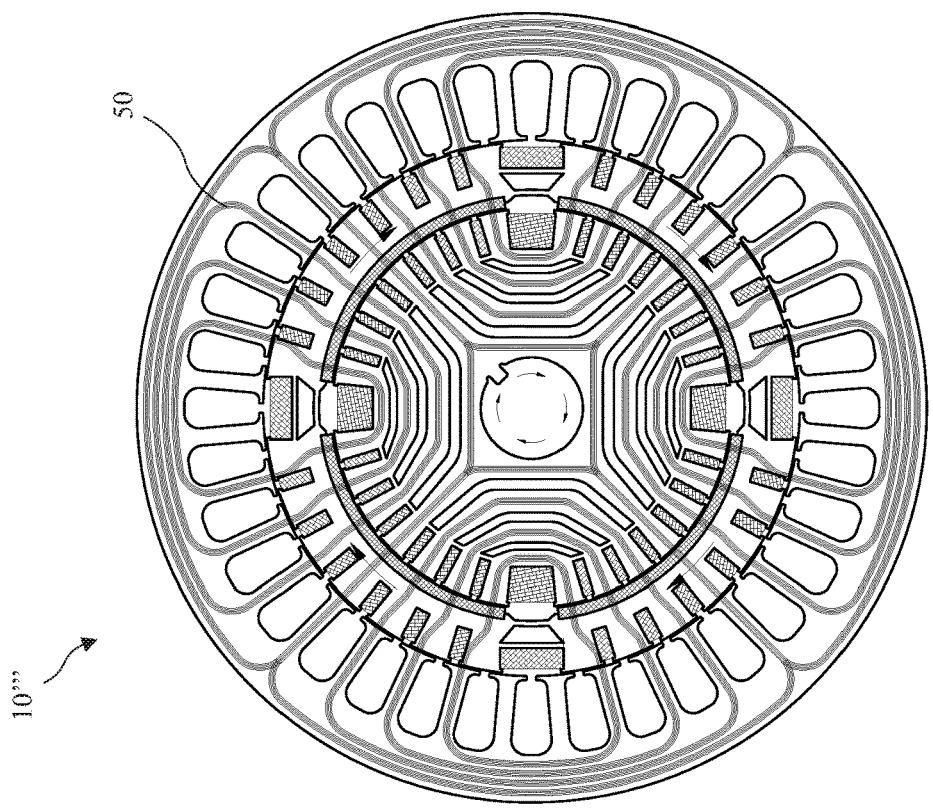
FIG. 48B shows magnetic field lines of the sixth embodiment of the motor having a hybrid inductive/permanent magnet outer rotor at synchronous speed according to the present invention.
Figure 48A:
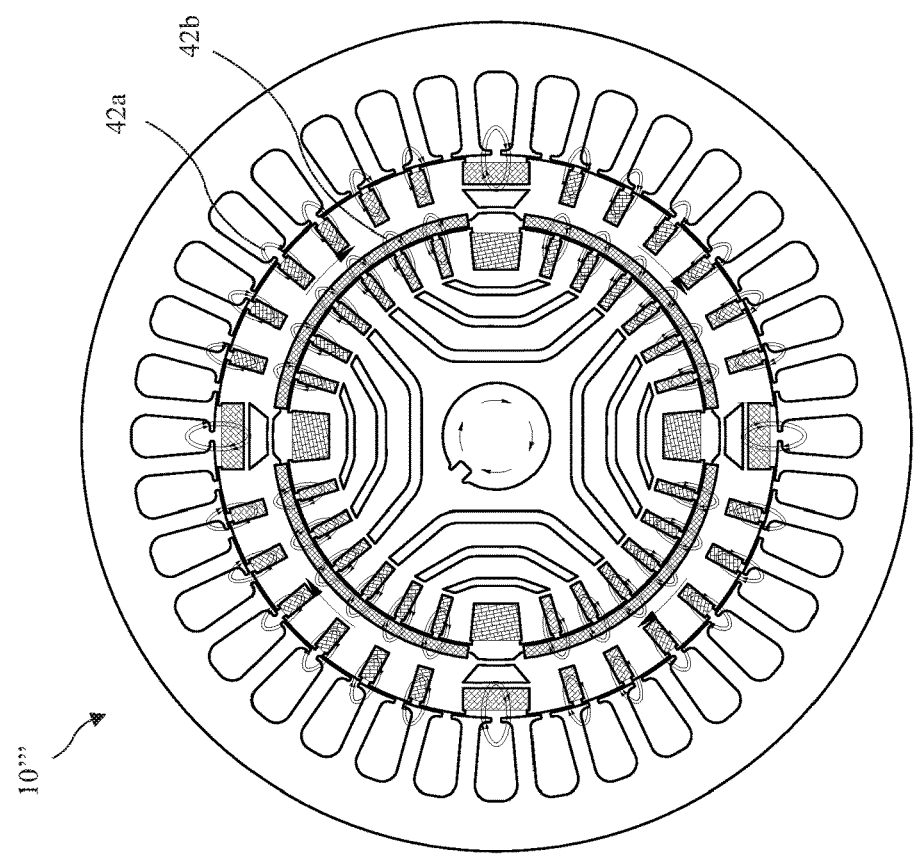
FIG. 48A shows magnetic field lines of the sixth embodiment of the motor having a hybrid inductive/permanent magnet outer rotor at startup according to the present invention.

Magnetic field lines 42a between the stator windings 18 and the bars 26a and 26b at startup and magnetic field lines 42b between the permanent magnets 22''' and the bars 32a and 32b of the electric motor 10''' just after at startup are shown in FIG. 48A. The magnetic field lines 42a result from slippage of the bars 26a and 26b with respect to the rotating stator magnetic field. The magnetic field lines 42a are immediately present at startup because the HPMSC outer rotor 20" is stationary at startup, and slippage is present between the stationary HPMSC outer rotor 20" and the rotating stator magnetic field. The slippage results in current generation in the bars 26 through magnetic induction, and the current produces torque on the HPMSC outer rotor 20" to accelerate the HPMSC outer rotor 20".

Nearly immediately after startup, as the HPMSC outer rotor 20" begins to rotate, slippage is developed between the permanent magnets 22''' of the HPMSC outer rotor 20" and the bars 32a and 32b of the SC inner rotor 30", producing the magnetic field lines 42b. It is an important feature of the electric motor 10''' that the magnetic field lines 42b are not present immediately at startup, because such magnetic field lines rotationally couple the HPMSC outer rotor 20" to the SC inner rotor, creating resistance to acceleration of the HPMSC outer rotor 20". Such resistance may prevent the HPMSC outer rotor 20" from overcoming the braking and pulsating torques caused by the permanent magnets in know LSPM motors, and limit the strength of the permanent magnets 22''', thus limiting the efficiency of the motor 10. The electric motor 10''' is thus self regulating, only coupling the HPMSC outer rotor 20" to the SC inner rotor 30" and motor shaft 14, after the HPMSC outer rotor 20" has overcome the braking and pulsating torques.

Magnetic field lines 50 between the stator windings 18 and the permanent magnets 22''', and further penetrating the SC inner rotor 30" of the electric motor 10''' at synchronous speed, are shown in FIG. 48B. At synchronous speed, there is no slippage between the rotating stator magnetic field and the bars 26a, 26b, 32a, and 32b, and therefore no electrical cooperation between the rotating stator magnetic field and the bars 26a, 26b, 32a, and 32b. The rotating stator magnetic field now cooperates fully with the permanent magnets 22''', and is guided though the SC inner rotor by the flux barriers 60.

Figure 49A:
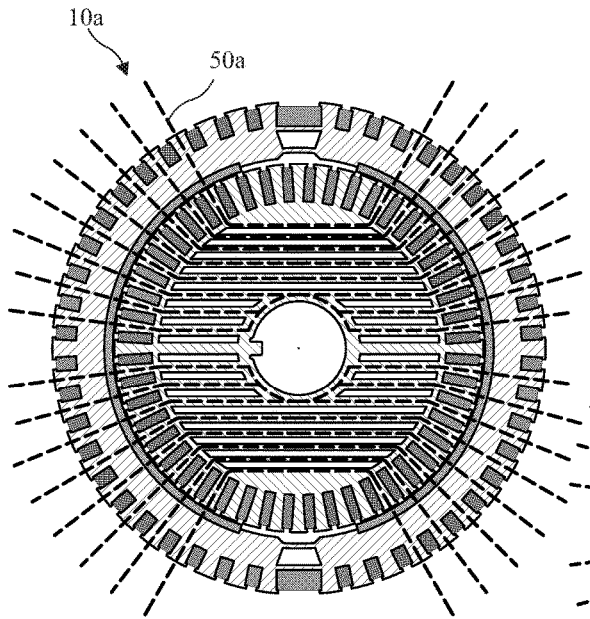
FIG. 49A shows magnetic field lines of a two pole embodiment of the sixth embodiment of the motor having a hybrid inductive/permanent magnet outer rotor at synchronous speed, excluding the stator, according to the present invention.
Figure 49B:
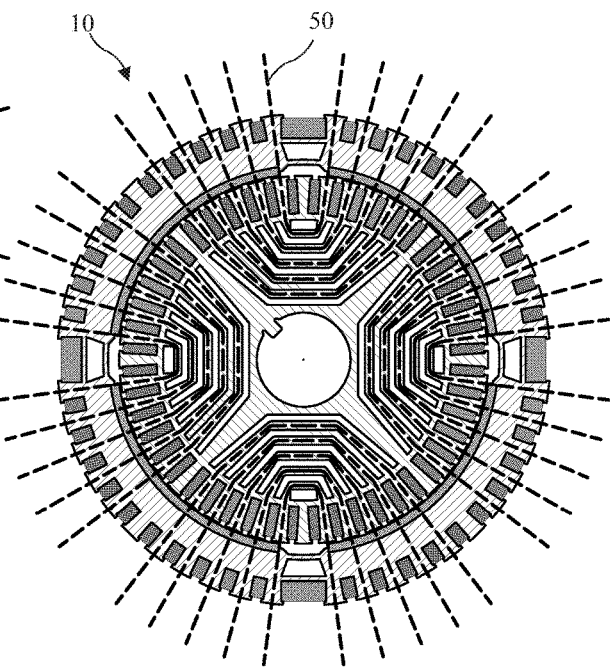
FIG. 49B shows magnetic field lines of a four pole embodiment of the sixth embodiment of the motor having a hybrid inductive/permanent magnet outer rotor at synchronous speed, excluding the stator, according to the present invention.
Figure 49C:
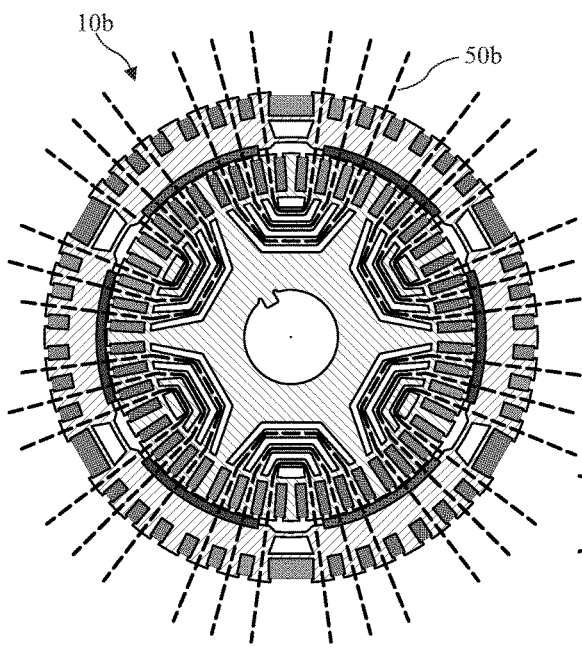
FIG. 49C shows magnetic field lines of a six pole embodiment of the sixth embodiment of the motor having a hybrid inductive/permanent magnet outer rotor at synchronous speed, excluding the stator, according to the present invention.
Figure 49D:
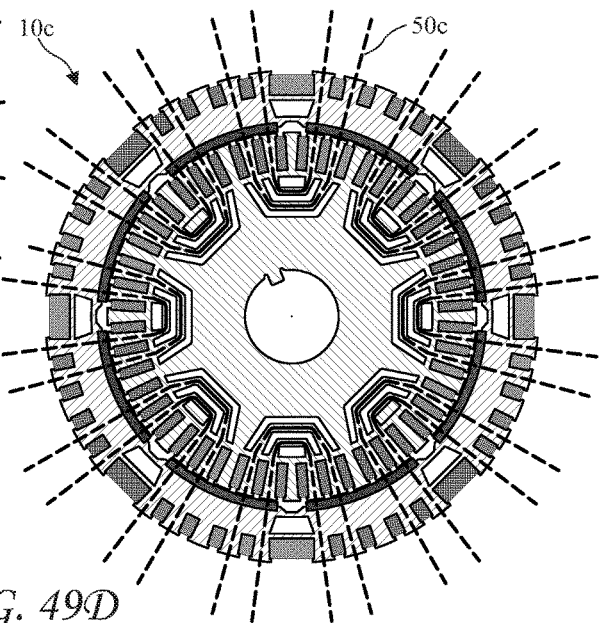
FIG. 49D shows magnetic field lines of an eight pole embodiment of the sixth embodiment of the motor having a hybrid inductive/permanent magnet outer rotor at synchronous speed, excluding the stator, according to the present invention.

Magnetic field lines of a two pole embodiment of the electric motor 10''', excluding the stator 16, are shown in FIG. 49A, magnetic field lines of a four pole embodiment of the electric motor 10''', excluding the stator 16, are shown in FIG. 49B, magnetic field lines of a six pole embodiment of the electric motor 10''', excluding the stator 16, are shown in FIG. 49C, and magnetic field lines of an eight pole embodiment of the electric motor 10''', excluding the stator 16, are shown in FIG. 49D.

Figure 50:
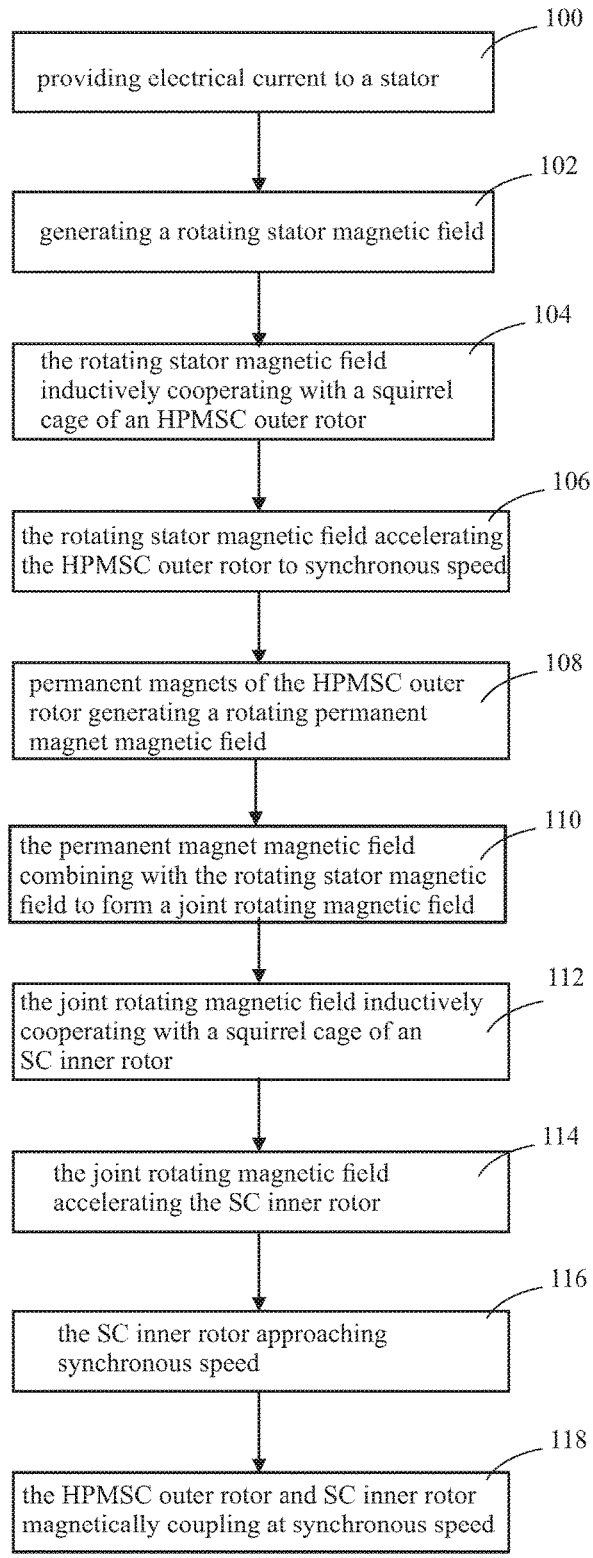
FIG. 50 shows a method according to the present invention.

A method according to the present invention is shown in FIG. 50. The method includes providing electrical current to a stator at step 100, generating a rotating stator magnetic field at step 102, the rotating stator magnetic field inductively cooperating with a squirrel cage of an HPMSC outer rotor at step 104, the rotating stator magnetic field accelerating the HPMSC outer rotor at step 106, permanent magnets of the HPMSC outer rotor generating a rotating permanent magnet magnetic field at step 108, the permanent magnet magnetic field combining with the rotating stator magnetic field to form a joint rotating magnetic field at step 110, the joint rotating magnetic field inductively cooperating with a squirrel cage of an SC inner rotor at step 112, the joint rotating magnetic field accelerating the SC inner rotor at step 114, the SC inner rotor approaching synchronous speed at step 116, and the HPMSC outer rotor and SC inner rotor magnetically coupling at synchronous speed at step 118. An important feature of the method being that the HPMSC outer rotor is not coupled to the SC inner rotor until the HPMSC outer rotor is rotating, and can thus overcome the braking and pulsating torques which limit permanent magnet strength in LSPM motors.

A hybrid electric motor having an HPMSC outer rotor and an SC inner rotor is described. The HPMSC outer rotor includes first electrically conductive squirrel cage bars embedded in a first rotor core and a number of the permanent magnets on an inner surface of the second rotor core, the HPMSC outer rotor residing between the stator and SC inner rotor and coaxial with the motor shaft, and is not mechanically coupled to rotate with the motor shaft during any operation. The SC inner rotor is fixed to the motor shaft residing coaxial with the motor shaft and having a second rotor core, and a second electrically conductive squirrel cage bars embedded in the second rotor core, and flux barriers guiding the rotating stator filed through the SC inner rotor at synchronous speed. Those skilled in the art will recognize other embodiments with different numbers of magnets, bars, and flux barriers not described here, but relying on the principles disclosed here, and those embodiments are intended to come within the scope of the present invention.

Figure 51:
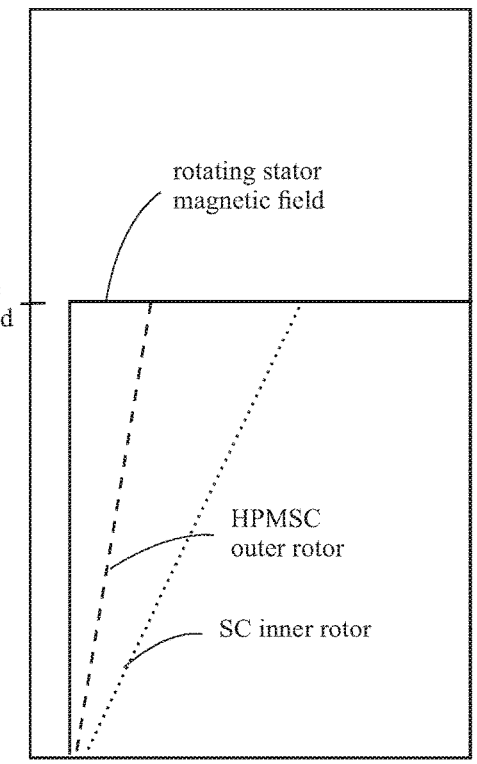
FIG. 51 shows a time line for rotations according to the present invention.

A time line for rotations of the stator magnetic field, the HPMSC outer rotor magnetic field, and the SC inner rotor magnetic field are shown in FIG. 51.

Figure 52:
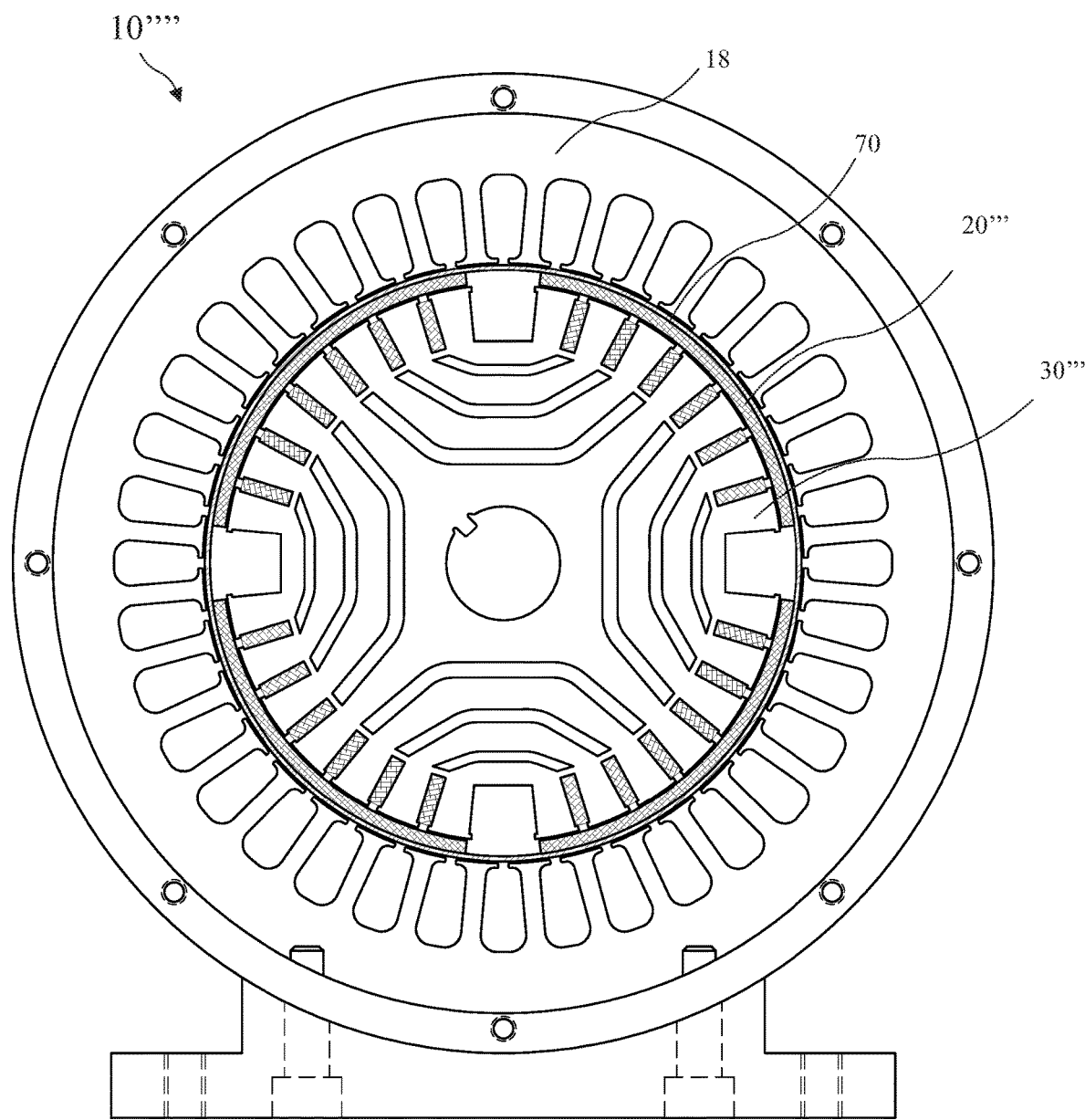
FIG. 52 shows a cross-sectional view of an embodiment of the present invention including a Hybrid Permanent Magnet Hysteresis (HPMH) outer rotor.

A cross-sectional view of a hybrid induction electric motor 10"" of the present invention including a Hybrid Permanent Magnet Hysteresis (HPMH) outer rotor 20''' is shown in FIG. 52. The inductive starting element is an eddy current (or hysteresis) ring 70 (see FIG. 54) which replaces the squirrel cage 26a and 26b of the HPMSC outer rotor 20" (see FIG. 43) to provide initial starting torque. The major squirrel cage bars 32b of the SC inner rotor are not required and not shown in the hybrid induction motor 10"". The hybrid induction motor 10"" is otherwise similar to the hybrid induction motor 10'''.

Figure 53B:
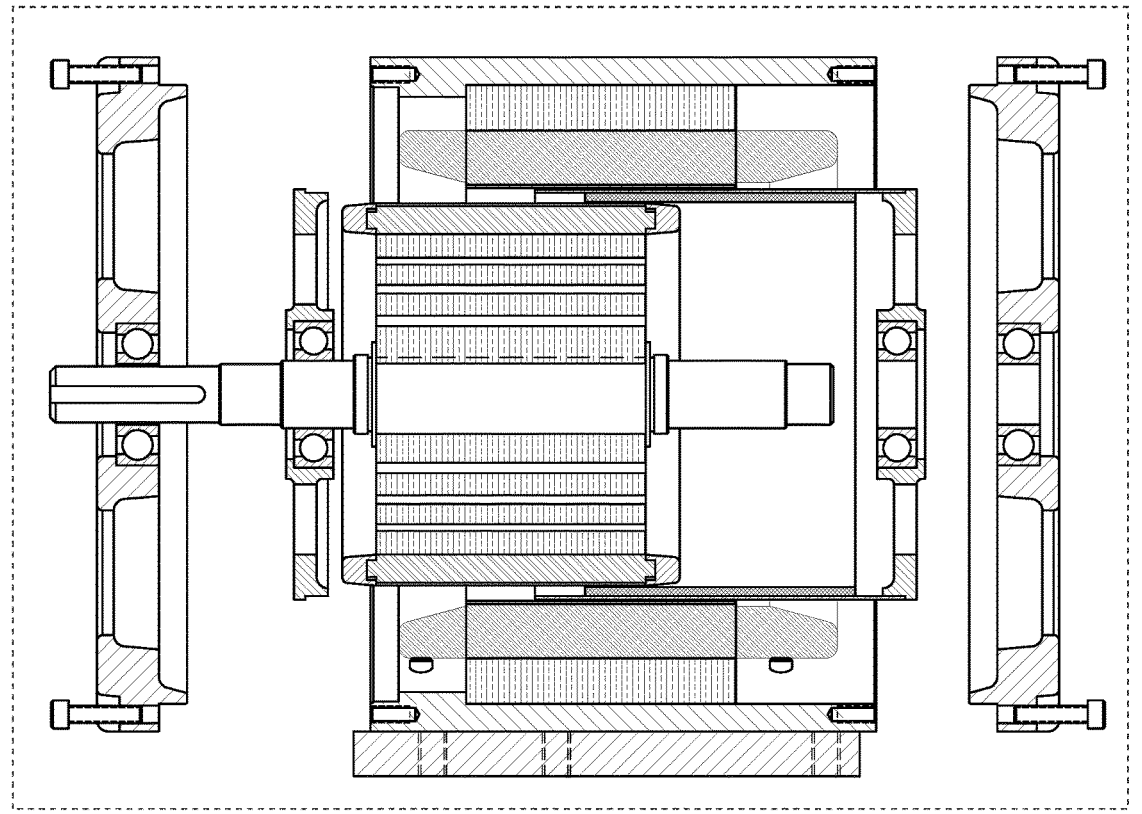
FIG. 53B is an exploded cross-sectional side view of the embodiment of the present invention including an HPMH outer rotor.
Figure 53A:
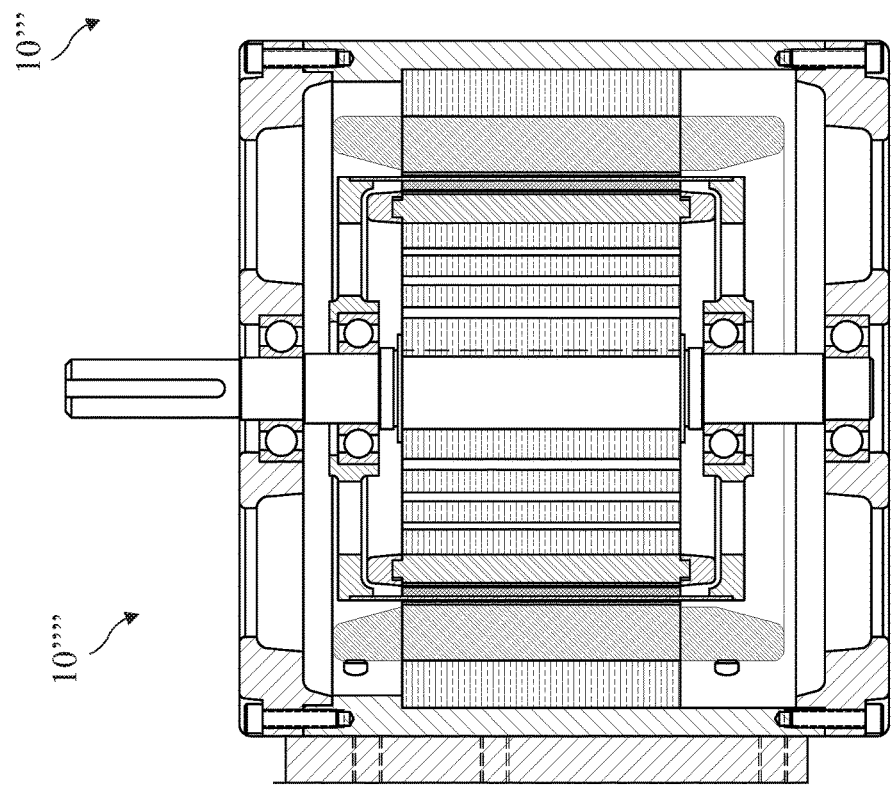
FIG. 53A is a cross-sectional side view of the embodiment of the present invention including an HPMH outer rotor.

A cross-sectional side view of the hybrid induction motor 10''' including an HPMH outer rotor is shown in FIG. 53A and an exploded cross-sectional side view of the hybrid induction motor 10' including an HPMH outer rotor is shown in FIG. 53B.

Figure 54:
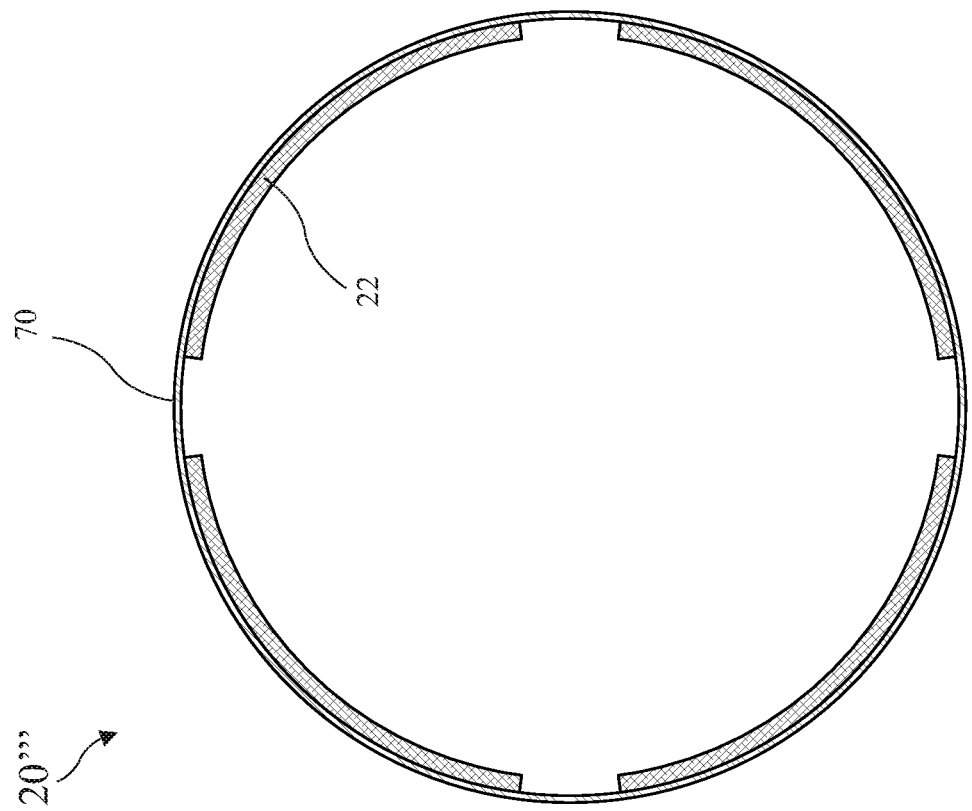
FIG. 54 is a cross-sectional side view of the HPMH outer rotor according to the present invention.

A cross-sectional side view of the HPMH outer rotor according to the present invention showing the eddy current ring 70 is shown in FIG. 54. Once the HPMH outer rotor 20''' reaches synchronous speed, the eddy current ring 70 has no effect on motor operation. The eddy current ring 70 may be any electrically conductive material would be potential material for starting element and is commonly hard chrome or cobalt steel but may be any non ferrous material. A preferably material for the HPMH outer rotor ring of the present invention is copper which is efficient because of its high electrical conductivity. Silver is slightly better performing than copper having better electrical conductivity and aluminum is lower performing than copper having less electrical conductivity. Potentially, new nanotechnology and a new class of highly conductive material could offer better performance than copper.

Figure 55:
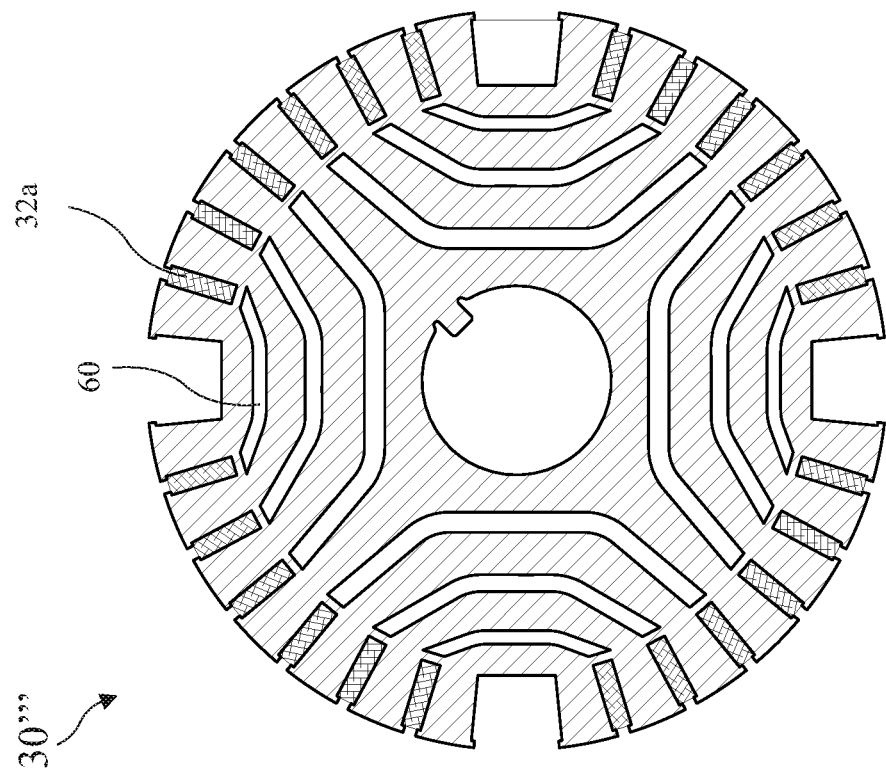
FIG. 55 is a cross-sectional side view of a second SC inner rotor according to the present invention.

A cross-sectional side view of the second SC inner rotor 30''' is shown in FIG. 55. The SC inner rotor 30''' does not show the major squirrel cage bars 32b which may be present, but are not necessary. The SC inner rotor 30''' is otherwise similar to the SC inner rotor 30".

Several embodiments of hybrid electric motors having an inner rotor rotationally fixed to the motor shaft residing coaxial with the motor shaft and having a second rotor core, and at least one of second electrically conductive squirrel cage bars embedded in the second rotor core and a number N of the permanent magnets embedded in the second rotor core, and an outer rotor residing between the stator and inner rotor and coaxial with the motor shaft and capable of rotating independently of the motor shaft and having a first rotor core and first electrically conductive squirrel cage bars embedded in the rotor core, wherein the permanent magnets reside in at least one of the inner rotor and the outer rotor, are described above. Those skilled in the art will recognize other embodiments not described here with different numbers of magnets, bars, and slots, but relying on the principles disclosed here, and those embodiments are intended to come within the scope of the present invention.

While the invention herein disclosed has been described by means of specific embodiments and applications thereof, numerous modifications and variations could be made thereto by those skilled in the art without departing from the scope of the invention set forth in the claims.

I claim:
1. A method for transitioning from induction operation at startup to synchronous operation of a hybrid squirrel cage/permanent magnet motor comprising:
obtaining a hybrid squirrel cage and permanent magnet motor comprising:
a motor housing;
a stator fixed to the motor housing and producing a rotating stator magnetic field;
a motor shaft rotatably connected to the motor housing and extending from at least one end of the motor housing for attachment to a load;
a squirrel cage inner rotor rotationally fixed to the motor shaft residing coaxial with the motor shaft, the inner rotor including:
a second rotor core;
second electrically conductive squirrel cage bars embedded in the second rotor core; and
flux barriers inside the second rotor core, the flux barriers guiding the rotating stator magnetic field through the second rotor core during synchronous operation;
an outer rotor residing between the stator and inner rotor and coaxial with the motor shaft and not rotationally mechanically coupled to the motor shaft to rotate with the motor shaft and including:
a first rotor core;
inductive elements configured to cooperate with a rotating stator magnetic field to provide torque at startup; and
permanent magnets residing on an interior surface of the first rotor core;
providing an Alternating Current (AC) signal to the stator;
the rotating stator magnetic field inductively cooperating with the hybrid squirrel cage and permanent magnet outer rotor to create torque on the hybrid squirrel cage and permanent magnet outer rotor;
beginning rotation of the hybrid squirrel cage and permanent magnet outer rotor;
after the hybrid squirrel cage and permanent magnet outer rotor begins to rotate, the permanent magnets of the hybrid squirrel cage and permanent magnet outer rotor creating a second rotating magnetic field cooperating with the squirrel cage inner rotor;
accelerating the hybrid squirrel cage and permanent magnet outer rotor towards synchronous engine speed;
near synchronous engine speed, the hybrid squirrel cage and permanent magnet outer rotor and stator combining to form a joint rotating magnetic field;
the joint rotating magnetic field inductively cooperating with the second electrically conductive squirrel cage bars of the squirrel cage inner rotor;
the squirrel cage inner rotor approaching synchronous engine speed; and
the hybrid squirrel cage and permanent magnet outer rotor and the squirrel cage inner rotor magnetically coupling at synchronous engine speed.

2. A method for transitioning from induction operation at startup to synchronous operation of a hybrid squirrel cage/permanent magnet motor comprising:
obtaining a hybrid squirrel cage/permanent magnet motor comprising:
a motor housing;
a stator fixed to the motor housing and producing a rotating stator magnetic field;
a motor shaft rotatably connected to the motor housing and extending from at least one end of the motor housing for attachment to a load;

a squirrel cage inner rotor rotationally fixed to the motor shaft residing coaxial with the motor shaft and comprising:
   a second rotor core;
   second electrically conductive squirrel cage bars embedded angularly spaced apart in a second exterior surface of the second rotor core; and
   voids creating flux barriers inside the second rotor core, the flux barriers comprising concave paths connecting interior ends of the second electrically conductive squirrel cage bars and guiding the rotating stator magnetic field through the second rotor core during synchronous operation; and
an outer rotor residing between the stator and squirrel cage inner rotor and coaxial with the motor shaft and not mechanically coupled to the motor shaft, the squirrel cage inner rotor, and the stator, and comprising:
   a first rotor core;
   first electrically conductive squirrel cage bars embedded in the first rotor core; and
   permanent magnets on an interior surface of the first rotor core;
providing an Alternating Current (AC) signal to the stator;
creating a rotating stator magnetic field inductively cooperating with the hybrid squirrel cage and permanent magnet outer rotor to create torque on the hybrid squirrel cage and permanent magnet outer rotor;
beginning rotation of the hybrid squirrel cage and permanent magnet outer rotor;
after the hybrid squirrel cage and permanent magnet outer rotor begins to rotate, the permanent magnets of the hybrid squirrel cage and permanent magnet outer rotor creating a second rotating magnetic field cooperating with the squirrel cage inner rotor;
accelerating the hybrid squirrel cage and permanent magnet outer rotor towards synchronous engine speed;
near synchronous engine speed, the hybrid squirrel cage and permanent magnet outer rotor and stator combining to form a joint rotating magnetic field;
the joint rotating magnetic field inductively cooperating with the second electrically conductive squirrel cage bars of the squirrel cage inner rotor;
the squirrel cage inner rotor approaching synchronous engine speed; and
the hybrid squirrel cage and permanent magnet outer rotor and the squirrel cage inner rotor magnetically coupling at synchronous engine speed.

3. A method for transitioning from induction operation at startup to synchronous operation of an inductive/permanent magnet motor comprising:
providing an Alternating Current (AC) signal to a fixed stator;
creating a rotating stator magnetic field inductively cooperating with an inductive and permanent magnet rotor to create torque on the inductive and permanent magnet rotor, the hybrid inductive and permanent magnet rotor comprising:
   the inductive and permanent magnet rotor residing coaxial with a motor shaft and having a first rotor core, angularly spaced apart permanent magnets embedded in the first rotor core, and inductive elements, the inductive and permanent magnet rotor not rotationally mechanically coupled to the motor shaft at any time other than parasitic mechanical rotational coupling through bearings coupling the inductive and permanent magnet rotor to the motor shaft, and the inductive and permanent magnet rotor capable of rotating independently of the motor shaft, and solely mechanically coupled to all other motor elements through the bearings;
the rotation of the inductive and permanent magnet rotor;
after the inductive and permanent magnet rotor begins to rotate, the permanent magnets of the inductive and permanent magnet rotor creating a second rotating magnetic field cooperating with a squirrel cage rotor, the squirrel cage rotor comprising:
   the squirrel cage rotor residing coaxial with the motor shaft and having a second rotor core, flux barriers in the second rotor core, and second squirrel cage bars embedded in the second rotor core, and the squirrel cage second rotor rotationally fixed to the motor shaft;
accelerating the inductive and permanent magnet rotor towards synchronous engine speed;
near synchronous engine speed, the inductive and permanent magnet rotor, and the stator, combining to form a joint rotating magnetic field;
the joint rotating magnetic field inductively cooperating with the second squirrel cage bars of the squirrel cage second rotor;
the squirrel cage rotor approaching synchronous engine speed;
at synchronous speed, the inductive and permanent magnet rotor, and the squirrel cage rotor, magnetically coupling with the rotating stator magnetic field cooperating with the permanent magnets; and
at synchronous speed, the flux barriers guiding the rotating stator magnetic field though the second rotor core.

4. The motor of claim 3, wherein the flux barriers are aligned with pairs of the second squirrel cage bars and lines of the joint rotating magnetic field pass between the second squirrel cage bars and between the flux barriers.

5. The motor of claim 3, wherein the flux barriers are non-ferrous.

6. The motor of claim 3, wherein the flux barriers are voids in the second rotor core.

7. The motor of claim 3, wherein the rotating stator magnetic field inductively cooperating with an inductive and permanent magnet rotor comprises the rotating stator magnetic field inductively cooperating with angularly spaced apart squirrel cage bars in the inductive and permanent magnet rotor.

8. The motor of claim 3, wherein the flux barriers are concave paths reaching into the second rotor core and connecting interior ends of the second squirrel cage bars.

9. The motor of claim 3, wherein the inductive elements comprise a multiplicity of angularly spaced apart first minor squirrel cage bars separated into equal number groups angularly separated by first major squirrel cage bars, the number of groups and the number of first major squirrel cage bars equal to the number of poles of the motor.

10. The motor of claim 3, wherein the rotating stator magnetic field inductively cooperating with an inductive and permanent magnet rotor comprises the rotating stator magnetic field inductively cooperating with an eddy current ring of the inductive and permanent magnet rotor.

11. The motor of claim 10, wherein the eddy current ring resides on a surface of the inductive and permanent magnet rotor facing the stator.

12. The motor of claim 3, wherein:
the first rotor includes a number N of the permanent magnets;

the second electrically conductive squirrel cage bars are proximal to a surface of the second rotor core facing the first rotor and comprise N groups of bars;

each of the N groups of bars has right half bars in a right half, and left half bars in a left half, and flux barriers reach from first interior ends of at least one of the left half bars of each of the N groups of bars, into the second rotor core and to second interior ends of at least one of the right half bars of each of the N groups of bars.

13. The motor of claim 12, wherein:

the flux barriers are spaced apart; and the flux barriers connecting left most of the left half bars with right most of the right most bars reach deeper into the second rotor core than the flux barriers connecting left most and right most bars nearer to a center of each of the N groups of bars.

14. The motor of claim 3, wherein:

the permanent magnets comprise N angularly spaces apart permanent magnets;

the inductive elements comprise electrically conductive squirrel cage first minor bars and electrically conductive squirrel cage first major bars embedded in the first rotor core, the first major bars having a larger cross-section than the first minor bars;

the first minor bars comprise N groups of the first minor bars, each of the groups residing angularly aligned with one of the N permanent magnets;

the first major bars comprise N first major bars aligned with gaps between consecutive ones of the N permanent magnets; and non-magnetically conducting gaps in the rotor core angularly aligned with the N first major bars.

15. The motor of claim 14, wherein:

the second squirrel cage bars comprise N groups of second minor bars and M second major bars; and the second minor bars are aligned with the first minor bars, and the second major bars are aligned with the first major bars, during synchronous operation.

16. The motor of claim 3, wherein:

the stator is outside both the first rotor and the second rotor;

the second rotor is an inner rotor; and the first rotor is an outer rotor residing between the inner rotor and the stator.

17. The motor of claim 16, wherein at startup:

first magnetic field lines connect the stator to the inductive elements of the first rotor, accelerating the outer rotor; and second magnetic field lines connect the permanent magnets in the outer rotor to the second electrically conductive squirrel cage bars embedded in the inner rotor, accelerating the second rotor.

18. The motor of claim 17, wherein at synchronous speed, third magnetic field lines pass from the stator, through the outer rotor and the permanent magnets, between the second electrically conductive squirrel cage bars embedded in the inner rotor, and between the flux barriers in the inner rotor core.

* * * * *